US012768989B2

(12) United States Patent
DeWeert

(10) Patent No.: US 12,768,989 B2
(45) Date of Patent: Oct. 20, 2026

(54) AIRBORNE OPTICAL CHARACTERIZATION OF UNDERWATER SOUND SOURCES

(71) Applicant: BAE SYSTEMS INFORMATION AND ELECTRONIC SYSTEMS INTEGRATION INC., Nashua, NH (US)

(72) Inventor: Michael J. DeWeert, Kaneohe, HI (US)

(73) Assignee: BAE Systems Information and Electronic Systems Integration Inc., Nashua, NH (US)

(*) Notice: Subject to any disclaimer, the term of this patent is extended or adjusted under 35 U.S.C. 154(b) by 908 days.

(21) Appl. No.: 18/090,974

(22) Filed: Dec. 29, 2022

(65) Prior Publication Data

US 2024/0230900 A1 Jul. 11, 2024

(51) Int. Cl.

| | |
|---|---|
| ***G01S 17/00*** | (2020.01) |
| ***G01B 11/16*** | (2006.01) |
| ***G01S 17/18*** | (2020.01) |
| ***G01S 17/89*** | (2020.01) |

(52) U.S. Cl.
CPC ............ *G01S 17/18* (2020.01); *G01B 11/162* (2013.01); *G01S 17/89* (2013.01)

(58) Field of Classification Search
USPC .......................................................... 356/5.04
See application file for complete search history.

(56) References Cited

U.S. PATENT DOCUMENTS

| | | | | |
|---|---|---|---|---|
| 7,855,786 | B2 | 12/2010 | Sparks et al. | |
| 8,179,535 | B2 * | 5/2012 | Martin .................. | H04B 11/00 73/657 |
| 9,445,115 | B2 | 9/2016 | Deweert et al. | |
| 9,476,700 | B2 | 10/2016 | Deweert et al. | |
| 9,818,181 | B1 | 11/2017 | Acker et al. | |
| 10,620,051 | B2 | 4/2020 | Acker et al. | |
| 10,634,765 | B1 | 4/2020 | Acker et al. | |
| 10,643,313 | B2 | 5/2020 | Deweert et al. | |
| 10,794,767 | B1 * | 10/2020 | Acker ....................... | G01J 4/02 |
| 10,863,121 | B1 | 12/2020 | Deweert | |
| 10,911,696 | B2 | 2/2021 | Choiniere et al. | |
| 10,914,573 | B2 * | 2/2021 | Acker .................... | G06V 10/82 |
| 10,931,899 | B1 | 2/2021 | Deweert | |
| 11,069,035 | B2 | 7/2021 | Deweert | |
| 11,187,523 | B1 | 11/2021 | Deweert et al. | |
| 11,287,244 | B1 | 3/2022 | Acker et al. | |

(Continued)

*Primary Examiner* — James R Hulka
(74) *Attorney, Agent, or Firm* — Sand, Sebolt & Wernow LPA; Gary McFaline

(57) ABSTRACT

An interferometry system and method thereof detects movements of the surface of a body of water in response to acoustic waves generated from a sub-surface source interacting with the surface. Movements of the surface of the body of water are viewed over multiple interferometric images that can be pieced together to generate an interferometric movie or video. The interferometric movie or video depicts the movement of the acoustic wave propagating through the viewing area. Once the movement of the acoustic wave propagating through the viewing area is known, then back propagation techniques are employed to determine or triangulate the location of the sub-surface source that generated the acoustic wave.

20 Claims, 12 Drawing Sheets

(56) References Cited

U.S. PATENT DOCUMENTS

| | | | | |
|---|---|---|---|---|
| 11,290,363 | B2 | 3/2022 | Deweert | |
| 11,396,354 | B2 * | 7/2022 | DeWeert | G05D 1/0206 |
| 11,650,042 | B2 * | 5/2023 | Saxer | G01S 7/497<br>356/520 |
| 11,754,692 | B2 * | 9/2023 | DeWeert | G01S 17/89<br>356/4.01 |
| 2007/0159541 | A1 | 7/2007 | Sparks et al. | |
| 2010/0060901 | A1 * | 3/2010 | Martin | H04B 11/00<br>356/512 |
| 2015/0139560 | A1 | 5/2015 | Deweert et al. | |
| 2015/0338208 | A1 | 11/2015 | Deweert et al. | |
| 2019/0228506 | A1 | 7/2019 | Deweert et al. | |
| 2019/0310372 | A1 * | 10/2019 | Crouch | G01S 7/4911 |
| 2020/0088583 | A1 | 3/2020 | Acker et al. | |
| 2020/0204744 | A1 | 6/2020 | Choiniere et al. | |
| 2020/0363185 | A1 * | 11/2020 | Saxer | G02B 27/106 |
| 2020/0378751 | A1 * | 12/2020 | Acker | G06N 3/084 |
| 2021/0183017 | A1 | 6/2021 | Deweert | |
| 2021/0302555 | A1 | 9/2021 | Deweert | |
| 2021/0306248 | A1 | 9/2021 | Deweert | |
| 2021/0323644 | A1 | 10/2021 | Deweert et al. | |
| 2021/0372779 | A1 | 12/2021 | Deweert et al. | |
| 2022/0000344 | A1 | 1/2022 | Tang et al. | |
| 2024/0241280 | A1 * | 7/2024 | DeWeert | G01V 1/226 |

* cited by examiner

AIRBORNE OPTICAL CHARACTERIZATION OF UNDERWATER SOUND SOURCES

TECHNICAL FIELD

The present disclosure relates generally to interferometry and utilizing various interferometry techniques to process calculations to determine a sound source based on movements of a target surface.

BACKGROUND

Bodies of water such as lakes and oceans respond to physical disturbances with a variety of motions, including surface waves, currents, and acoustic waves. The physics underlying these disturbances follows basic laws of motion and energy conservation, the mathematics of which follow the Navier-Stokes equations.

The physics of acoustic waves, and of water-surface gravity-capillary waves, are widely exploited in underwater communications and marine engineering. However, despite the commonality of the underlying principles, acoustic and gravity-capillary waves arise from such different boundary conditions and approximations that they are treated as independent phenomena.

Where the two phenomena meet, at the water's surface, the discrepancy is acute: Basic conservation of momentum requires the sea surface to move in response to incident sound waves, yet the dominant assumption is that the surface is rigid with respect to acoustic excitation—the approximate "pressure release" condition.

In Non Phase resolved (NPR) shearography, a target surface, part, or area being observed is illuminated by an expanding laser beam, and two time-sequential images are captured of the target surface, part, or area with an image-shearing camera. The first image is taken of the surface, and the second image is taken of the same surface a short time thereafter during deformation or loading of the surface. The two images taken are processed together to produce a third image (i.e., a shearogram) showing a fringe pattern that depicts the gradient of the displacement of the surface due to some loading of the surface between the first and second images.

More particularly, shearography is an optical measuring technique using coherent light for the interferometric observation of the surfaces typically under non-destructive loading to distinguish between structural information and anomalies of the surfaces or parts due to loading. Under each loading condition, the laser-illuminated area is viewed through a beam-splitter or similar device designed so that two copies of the incoming image electromagnetic (EM) field are generated. One copy of the image EM field is optically displaced laterally relative to the other, then the two image EM fields are then combined on a single focal plane to create an image. The lateral displacement is called the shear of the images. The image formed by recording the superposition of the two EM fields is called a shearogram, which is an interferogram of an object wave with a sheared version of itself as a reference wave. The shearogram formation process is repeated for a succession of (two or more) surface loading conditions.

The absolute difference of two shearograms recorded at different physical loading conditions of the target surface, part, or area is an interference fringe pattern which is directly correlated to the difference in the deformation state of the target surface, part, or area between taking the two images thereof. In contrast to holographic interferometry, the fringe pattern in NPR shearography indicates the magnitude (but not the sign or phase) of the slope of deformation rather than the deformation itself. Defects inside the target surface, part, or area will affect the local surface deformation induced by the loading and result in a disturbance of the loading fringes that are detected.

SUMMARY

The present disclosure leverages the fact that the sea surface moves in response to sound. The present disclosure presents exploitations of the Navier-Stokes equations that quantify the motions' amplitude, frequency-velocity dispersion, and the detailed mechanism of pressure release. Contrary to the usual assumptions, sound waves do move the sea surface, with typically microscopic amplitudes. Though microscopic, the amplitudes are on the order of, or even much larger than, the wavelength of light. In addition, the frequency-velocity dispersion is radically different from that of gravity-capillary waves. Combined, the amplitudes and the dispersion relationship enable laser interferometry to sense the sea surface and "listen" to the ocean without touching it.

Unlike the well-known technology of laser vibrometry, which is essentially a point measurement, the system and method of the present disclosure employs wide-field imaging interferometry to make videos or "movies" of the sea surface and exploits the dispersion relationships to separate acoustically-induced motions from the much-larger-amplitude gravity-capillary wave background (i.e., conventional ocean gravity or wind-generates surface waves).

The present disclosure utilizes laser interferometry techniques to detect the surface of a body of water, such as the ocean surface or a lake surface, and detect if there is an object making a noise below the water's surface based on incident sound waves interacting with the water's surface. To accomplish this, the present disclosure teaches an extra solution to the Navier-Stokes equations. The extra solution to the Navier-Stokes equations indicates that an incident sound wave can move the water surface. This teaching was not previously understood inasmuch as conventional teachings believed the water's surface to be a pressure release surface that doesn't move in response to acoustic waves. However, the present disclosure has determined that, based on the physics and conservation of momentum, that the water's surface must move albeit at extremely small levels, such as on the order of a few nanometers. The surface motions of the incident sound waves are very small compared to the gravity capillary waves, which are often on the order of feet or meters. Thus there is a large difference between the gravity capillary waves and the incident sound waves with respect to their influence on the water's surface. Additionally, there is also a large difference in how fast the respective waves are moving and their wave lengths. The sound waves move at the speed of sound. Whereas, the gravity capillary waves move at just a few meters per second. Additionally, the sound waves have very long wavelengths whereas the gravity capillary waves of the same frequency have relatively short wavelengths. The incident sound waves cause a disturbance over a wide area that is moving very fast. Thus the present disclosure enables laser interferometry to obtain a movie of a wide area over a short time, the system can filter slow moving things out and only capture the fast moving things. In this way the sea's surface containing the gravity capillary waves to be effectively stationary and only detect the sound waves. Laser interferometry enables the system to detect these differences and effectively filter out the gravity capillary waves and treat them as stationary over a very short period of time. Further, laser interferometry uses the wavelength of light, which is on the order of a micron or shorter, to sense disturbances that are on the order of a micron or shorter. Leveraging known information regarding the wavelengths of sound waves, the system is configured to create a wide-area movie to image sound waves moving along the water's surface. Because the sound waves are moving so much faster than the gravity capillary waves, the gravity capillary waves may be considered to be stationary relative to the speed of the acoustically-driven surface waves. When using a shearography system to accomplish the techniques disclosed herein, the shear distance shall be customized to the wavelength of sound. Recall, the wavelength of sound is meters long, whereas gravity-capillary waves at acoustic frequencies are on the order of inches. Otherwise, some of the commercial hardware is common to other shearography systems. Thus the hardware of the shearography system can take a fast burst of images of the ocean's surface.

The present disclosure enables, through its use of a Range-Sheared Interferometry. or vertical self-referenced interferometric imaging, or a range-sheared self-referenced interferometry system, detection and location of the sound source. Because the system enables the soundwave to be viewed, similar to that of a movie, as the soundwave moves through the scene, the system is able to determine the direction of the sound wave and back track where it came from or originated. If there is a wide enough field of view or multiple fields of view, the curvature of the wave front can be seen or determined. Then, triangulation techniques may be employed to locate back to the sound source under the water. The triangulation would be accomplished via back propagation processing.

Another feature of the present disclosure exploits the dispersion relationship of any waves. The gravity-capillary waves have one dispersion relationship. The acoustically-driven waves have a different one. The dispersion relationship is between the speed of a wave and its frequency. If waves of different frequencies travel at different speeds, a multi-frequency wave packet will disperse. The dispersion relation also relates between the frequency of a disturbance or wave and how fast it is moving. Namely, waves at different frequencies that are moving at different speeds results in multiple frequencies that will spread out or disperse. Namely, the faster moving frequencies will out run the slower moving frequencies. The dispersion relationship, which is the ratio between frequency and speed, distinguishes the acoustic disturbance at the surface from the background gravity capillary waves (i.e. the normal surface ocean waves). Thus, the present disclosure can use a shearographic movie to exploit the dispersion relationship to separate acoustic waves according the equations detailed herein from the gravity capillary waves. In one exemplary embodiment, it is provided that this is best done via a shearographic movie, however other embodiments could employ different techniques as well. Shearographic movies have been found to be advantageous, because to exploit the dispersion rate, a shearographic movie is sampled in both space and time. For example, if the system is observing an ocean surface area that is a 100 meters wide, and the sound speed is approximately 1,500 meters per second (which is 1/15 of a second that the system has to observe a soundwave moving through the area). The system is configured to observe the soundwave a sufficient amount of times to verify that the wave moving through the area is a soundwave, should observe the area for a period of time slightly greater than 1/15 of a second and should capture approximately seven or eight or more still images in that time period that can be aligned as image frames to be viewed sequentially as a movie. For example, if the period of time is equal to about 2/15 of a second, then the entire waveform can be seen moving through the viewing area in the video or movie. Then, if a soundwave is detected in that timeframe that needs to be further discriminated the system may enter a continuous monitoring mode. In the continuous mode, a sampling may occur on the order of one to five kilohertz over the sampling area. Alternatively rather than a continuous monitoring the system may employ successive burst of images.

As a soundwave moves through the water, the water compresses and rarifies. For example, there may be a pressure that is 60 decibels, relative to one micro Pascal, that is the pressure exerted on the ocean's surface or the water's surface as the soundwave hits it. When the soundwave reflects from the water's surface, the water's surface reacts. The reaction causes a wave that is downward in an opposite angle. In doing so, it doubles the pressure. Thus, right at the water's surface, the sound pressure level is doubled because the surface is bouncing waves through the reflection. Even with this bouncing or reflection of waves, the water's surface moves, albeit in a very slight manner, slightly vertically upwards. This is due to the fact that as the soundwave reaches the water's surface, the horizontal movement of the soundwave becomes negligibly small (i.e., almost to zero) while the vertical movement (perpendicular to the horizontal movement) escapes upward into the atmosphere resulting in a very slight disturbance of the surface in response to the soundwave. The very slight disturbance at the surface is in the order of just a few nanometers to several microns. This slight disturbance would be too small to be observed through acoustic sensors, however it has been determined that it can be viewed or observed through a laser interferometry system, such as a shearography system.

One exemplary aspect of an exemplary embodiment of the present disclosure exploits shear in range rather than laterally. This is accomplished by placing one or more beam-splitters at the source, rather than at the receiver, creating multiple copies of the transmitted laser pulse. The copies of the laser pulse are shifted in time relative to each other, then re-combined in a beam projector directed at the surface of interest. Thus, at a given time delay relative to the initial pulse generation, each copy of the pulse is at a slightly different range from the others. The laser light reflects from interfaces and backscatters from material in the translucent media. An optical receiver viewing the laser-illuminated area is time-gated to accept light only light from a fixed span of time delays, so that the multiple copies of the laser pulse combine information from different ranges into a single image in the receiver. Because the reflected and backscattered laser light is at least partly coherent, the combined light field contains speckle caused by interference of light from the multiple ranges. A succession of such mages acquired as the scene is perturbed will show changes in the speckle pattern due to the perturbation. The processing of such a succession of images reveals fringe patterns analogous to those in conventional shearography.

One exemplary aspect of an exemplary embodiment of the present disclosure proves a method that is applicable not just to air-water interfaces and acoustic excitations, but to any interface between two different transparent or translucent media, and any disturbance or stress that can change the shape of the interface or the optical properties of the adjacent media. In addition to water vs air, examples include water vs ice, ice vs air, oil vs water, polycarbonate plastic vs water, or many other combinations of materials. The differences over time can be produced by changes in temperature, salinity, acoustics, mechanical stress, chemical reactions, or many other processes. In addition, the method is applicable to multi-layered interfaces, such as air/oil/water. For example, aspects of the present disclosure are applicable to when acoustic waves perturb an interface between air and a non-water fluid, such hydrocarbons. Or, when acoustic waves perturb an interface between air and a translucent solid, such as ice, glass, or plastic. Or, when acoustic waves perturb an interface between any translucent fluids or solids. Or, when non-acoustic stresses perturb an interface between any translucent fluids or solids. Or, when acoustic or non-acoustic stresses perturb a multiple-layer interface, such as air/oil/water.

This exemplary method or another exemplary method may be applicable to acoustic excitations at interfaces between any fluids. For example, air and oil, oil and water, oil and alcohol. It also applies to complex boundaries between fluids, such as air/oil/water. In the case of oil floating on water, for example, acoustic waves incident on the oil-water surface from below will move the oil layer more than a plain water surface, due to the lower density of oil vs water. The oil in turn, will suppress capillary waves. The combined effects of enhanced acoustic motion and capillary wave suppression will increase the signal-to-noise ratio for detecting acoustically-induced surface waves. These properties are then exploited as taught herein to characterize oil-fouled water. The air-ice-water case is also of interest, for example, for tracking marine mammals or characterizing arctic seismic activity.

Another exemplary application is to characterize multi-layer fluids in which internal waves can be excited to move at the interface. The method can detect fluid-interface motions at extremely low amplitudes. One example is phase separation of oil and ethanol in fuel blends. Another example is internal waves at interfaces between water layers with different salinities or temperatures. The excitations may be induced by acoustic, mechanical, thermal, or chemical changes. So long as there is a motion of the interface, selecting the proper shearography shear distance and sampling rate will enable visualization of even microscopic changes.

Interfaces between fluid and solid materials, such as ice and water, or air and ice, or air and glass, can also be excited acoustically or mechanically, as can interfaces between disparate solids, such as glass as translucent polymers. Thus, various embodiments of the present disclosure may also be an alternative to polarized-light for detecting transient stress in translucent solids under mechanical strain. As such, there may be a system comprising: interferometric equipment including a laser beam generator and receiver; acoustic wave detection logic operatively connected to the interferometric equipment, the acoustic wave detection logic configured execute instructions on a non-transient computer readable storage medium to: transmit a first portion of a laser beam towards an interface surface; transmit a second portion of the laser beam towards the interface surface; receive, at the interferometer equipment, a reflected first beam from the first portion interacting with the interface surface; receive, at the interferometer equipment, a reflected second beam from the second portion interacting with the interface surface; measure, via the interferometer equipment, movement of acoustically driven surface waves at the interface surface at a reaction point in response to a subsurface acoustic wave interacting with the interface surface.

In yet another one aspect, an exemplary embodiment of the present disclosure may provide a system comprising: interferometric equipment including a laser beam generator and receiver; acoustic wave detection logic operatively connected to the interferometric equipment, the acoustic wave detection logic configured execute instructions on a non-transient computer readable storage medium to: transmit a first portion of a laser beam towards a surface of water; transmit a second portion of the laser beam towards the surface of water; receive, at the interferometer equipment, a reflected first beam from the first portion interacting with the surface of water; receive, at the interferometer equipment, a reflected second beam from the second portion interacting with the surface of water; measure, via the interferometer equipment, movement of acoustically driven surface waves at the surface of water at a reaction point in response to a subsurface acoustic wave interacting with the surface water; and disregard movement of gravity capillary waves. Because the laser beams are pulsed, time-gating the receiver provides a range gate for each laser pulse, with the range related to time by the speed of light. If multiple pulses are transmitted with time delays relative to each other, one receiver time gate produces multiple range gates, one range gate for each pulse. Light from the multiple range gates thus arrives simultaneously at the receiver, enabling interference between different range gates. This exemplary embodiment or another exemplary embodiment may further provide that the acoustic wave detection logic executes instructions to range gate, for the reflected first beam, the system at a first gate that is entirely below the surface of water. This exemplary embodiment or another exemplary embodiment may further provide that the acoustic wave detection logic executes instructions to range gate, for the reflected second beam, the system at a second gate that straddles the surface of water. This exemplary embodiment or another exemplary embodiment may further provide that the acoustic wave detection logic executes instructions to split the laser beam into the first portion and the second portion via a beam splitter, and delay the second portion from the first portion. This exemplary embodiment or another exemplary embodiment may further provide that the acoustic wave detection logic executes instructions to unequally split the laser beam into the first portion and the second portion. This exemplary embodiment or another exemplary embodiment may further provide that the unequal split results in the first portion being greater than the second portion. This exemplary embodiment or another exemplary embodiment may further provide that the acoustic wave detection logic executes instructions to vertically self-reference a pixel in the receiver with the reflected first beam and the reflected second beam by constructing a relative-phase reference for the beam based on the reflected first beam and the reflected second beam. This exemplary embodiment or another exemplary embodiment may further provide that the acoustic wave detection logic vertically self-references the pixels by executing instructions to mix a laser-illuminated image with a vertically-displaced image illuminated by the first portion and the second portion of the laser beam, respectively.

In another aspect, another exemplary embodiment of the present disclosure may provide a system comprising: a platform; interferometer equipment carried by the platform, the interferometer equipment including a laser beam generator and a receiver; acoustic wave detection logic carried by the platform including a non-transient computer readable storage medium having instructions encoded thereon that, when executed by a processor, execute operations to transmit a first portion of a laser beam towards a surface of water;

transmit a second portion of the laser beam towards the surface of water; receive, at the interferometer equipment, a reflected first beam from the first portion interacting with the surface of water; receive, at the interferometer equipment, a reflected second beam from the second portion interacting with the surface of water; measure, via the interferometer equipment, movement of acoustically driven surface waves at the surface of water at a reaction point in response to a subsurface acoustic wave interacting with the surface water; and disregard movement of gravity capillary waves.

In yet another aspect, another exemplary embodiment of the present disclosure may provide a computer program product including least one non-transitory computer readable storage medium on a moving platform in operative communication with a computer processing unit (CPU) in interferometer equipment having a laser beam generator and a receiver, the storage medium having instructions stored thereon that, when executed by the CPU, implement a process to determine the presence of a acoustically driven surface waves at a water surface generated from a subsurface acoustic source, the process comprising: transmitting a first portion of a laser beam towards a surface of water; transmitting a second portion of the laser beam towards the surface of water; receiving, at the interferometer equipment, a reflected first beam from the first portion interacting with the surface of water; receiving, at the interferometer equipment, a reflected second beam from the second portion interacting with the surface of water; measuring, via the interferometer equipment, movement of acoustically driven surface waves at the surface of water at a reaction point in response to a subsurface acoustic wave interacting with the surface water, wherein measuring movement is accomplished by vertically self-referencing a pixel in the receiver with the reflected first beam and the reflected second beam by constructing a relative-phase reference for the beam based on the reflected first beam and the reflected second beam and mixing a laser-illuminated image with a horizontally-displaced image illuminated by the first portion and the second portion of the laser beam, respectively; and disregarding movement of gravity capillary waves.

In yet another aspect, an exemplary embodiment of the present disclosure may provide an interferometry system and method thereof detects movements of the surface of a body of water in response to acoustic waves generated from a sub-surface source interacting with the surface. Movements of the surface of the body of water are viewed over multiple interferometric images that can be pieced together to generate an interferometric movie or video. The interferometric movie or video depicts the movement of the acoustic wave propagating through the viewing area. Once the movement of the acoustic wave propagating through the viewing area is known, then back propagation techniques are employed to determine or triangulate the location of the sub-surface source that generated the acoustic wave.

BRIEF DESCRIPTION OF THE SEVERAL VIEWS OF THE DRAWINGS

Sample embodiments of the present disclosure are set forth in the following description, are shown in the drawings and are particularly and distinctly pointed out and set forth in the appended claims.

DETAILED DESCRIPTION

Figure 1:
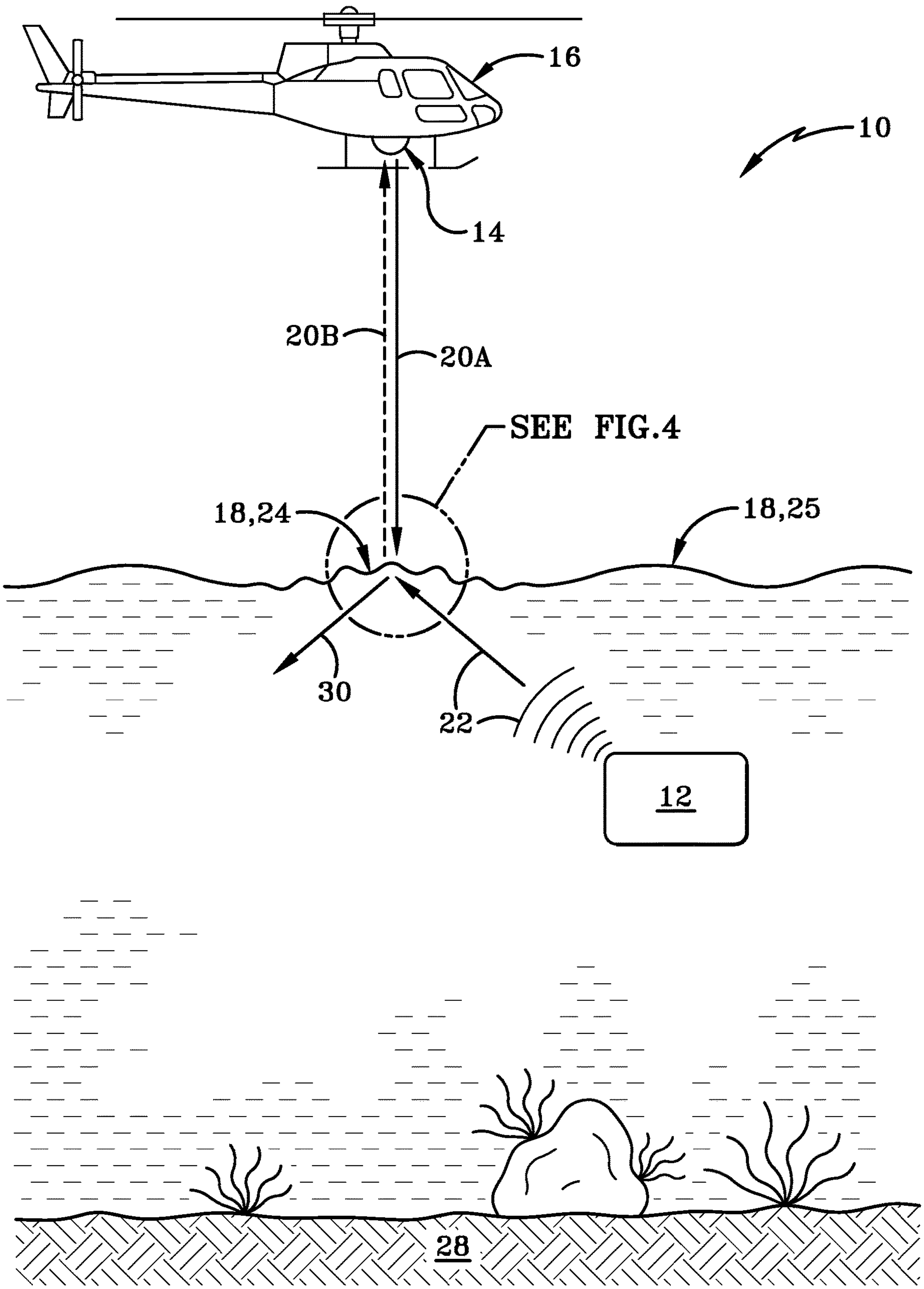
FIG. 1 (FIG. 1) is a diagrammatic view of the environment for airborne optical characterization of underwater sound sources according to various exemplary embodiments of the present disclosure.

FIG. 1 depicts details of present disclosure that provides a system, shown generally at 10, and method for characterizing or locating underwater sound sources 12 or other object that generate a subsurface wave. The underwater sounds sources 12 may be any known or unknown underwater item that generates noise in the form of an acoustic wave that travels through the water as a medium. This includes underwater vehicles (i.e. submarines, ROVs, and the like, regardless of whether they are manned or unmanned), or underwater animals or fish. The method may be implemented through the use of shearography equipment or apparatus 14 mounted on a moveable platform 16, which may include powered transport or vehicles such as aircraft, watercraft (surface craft or underwater craft), spacecraft or land motor vehicles which may be manned or unmanned, whereby, for instance, an aircraft may be a manned/piloted aircraft or an unmanned aerial vehicle (UAV). The moveable platform 16 may also be a handheld device which may move as a result of being carried by a person who is moving (under his or her own power or via a powered vehicle) or by being carried by one of the other moveable platforms noted above. The shearography equipment 14 moves with the moveable platform 16 relative to a target or target surface 18 (i.e., the ocean surface 18) during operation of shearography equipment 14. The movement of the moveable platform 16 and shearography equipment 14 during the emission of at least one laser beam 20A is typically generally parallel to the target surface 18 (i.e., the ocean surface)

Various computer implemented logics are in operative communication with shearography equipment 14, which may be a temporal-stepping shearography apparatus that is part of a system or assembly. This system of assembly may include a Michelson interferometer comprising one or more laser transmitters, a beam splitter, first and second mirrors, an image-shearing camera, and at least one non-transitory computer readable storage medium having instructions encoded thereon that, when executed by at least one processor, implements various logics to locate an underwater sound source, as more fully described below. This may be generally embodied as or referred to as acoustic wave detection logic. One of the mirrors in shearography equipment 14 may be steppable or movable to provide a phase-stepping system, however it is possible to implement the present disclosure with a fixed system. Alternately, an electronically controllable phase retarder may be used. Although a Michelson interferometer may be suitable for the present process, a variety of shearing interferometers may be used, such that the interferometer is configured to collect multiple shearographic images with controlled phase differences between the arms of the interferometer. A shearing configuration of any interferometer type is usable. For example, and without limitation, suitable interferometers may include glass-plate or glass-wedge interferometers, air-wedge interferometers, Mach-Zehnder interferometers and the like. Multi-port versions of any type of shearing interferometer may also be used.

In the basic operation of the shearography equipment 14 or apparatus, one of the one or more laser transmitters transmits, emits or shoots a laser beam 20A which impacts the target surface 18, such as the ocean surface 18, and is reflected from the target surface as a reflected laser beam 20B image back to the shearography equipment 14 into the beam splitter, onto mirrors and into the camera, which captures the reflected image in two copies which are laterally displaced (sheared image copies). The images may be combined to form a specklegram. Additionally, multiple specklegram images may be sequentially aligned as image frames to form a video or movie of the specklegram image frames. The reflected laser beam images and specklegrams, and video/movie thereof, may be stored or saved in the at least one non-transitory computer readable storage medium. The various logics are configured to process the specklegrams to produce a shearogram video/movie that enable detection of microscopic surface changes of target surface. The methods detailed herein then process/calculate the various relevant equations discussed below in order to effect the methods discussed herein for detecting the location of the sound source 12 based on surface change of the target surface 18 or ocean surface.

Having thus described the configuration and components of an exemplary system 10 according to aspects of the present disclosure, reference is now made to processes and methods implemented by the system. The system 10 utilizes shearography techniques to view ocean surface 18 disturbances caused by subsurface waves or acoustic waves 22 traveling through the water to identify the source 12 of the subsurface or acoustic wave 22. Surface 18 may be flat, under very calm wind conditions, but is typically wavy and moving with ambient gravity-capillary waves 25.

Figure 2:
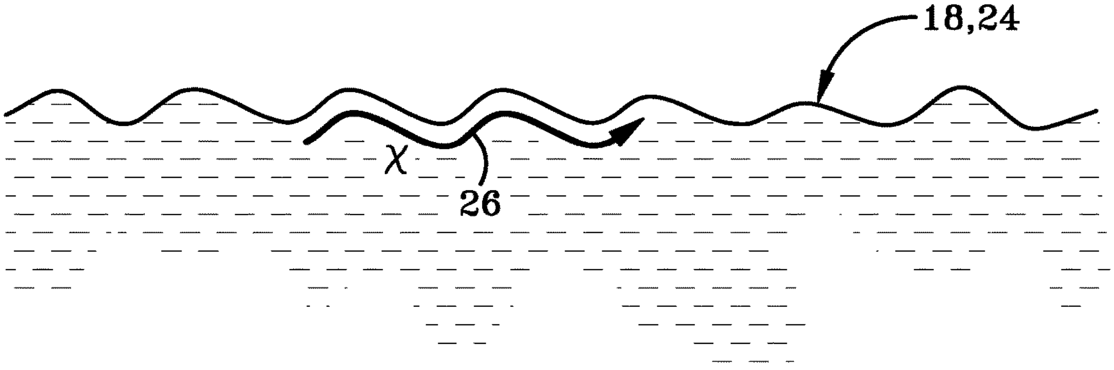
FIG. 2 (FIG. 2) is a diagrammatic view of water or ocean surface depicting a streamline there below.
Figure 3:
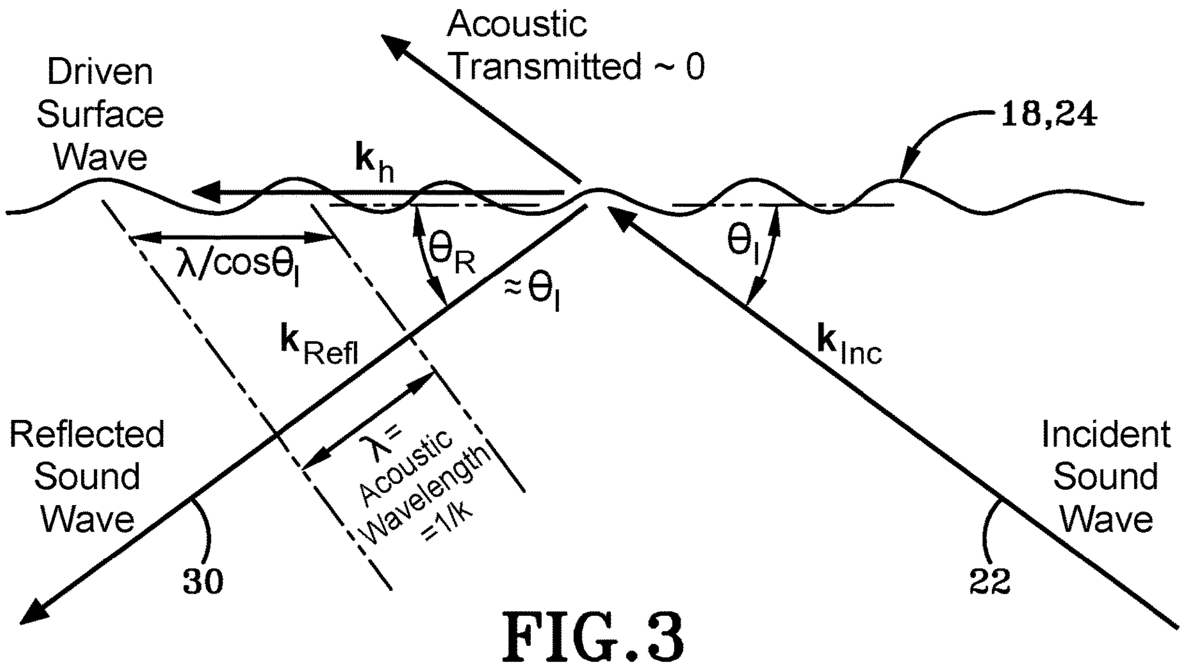
FIG. 3 (FIG. 3) is a schematic view of an incident sound wave traveling towards the surface of the water or ocean an generating acoustically driven surface waves distinct from gravity-capillary waves present in the water or ocean.
Figure 4:
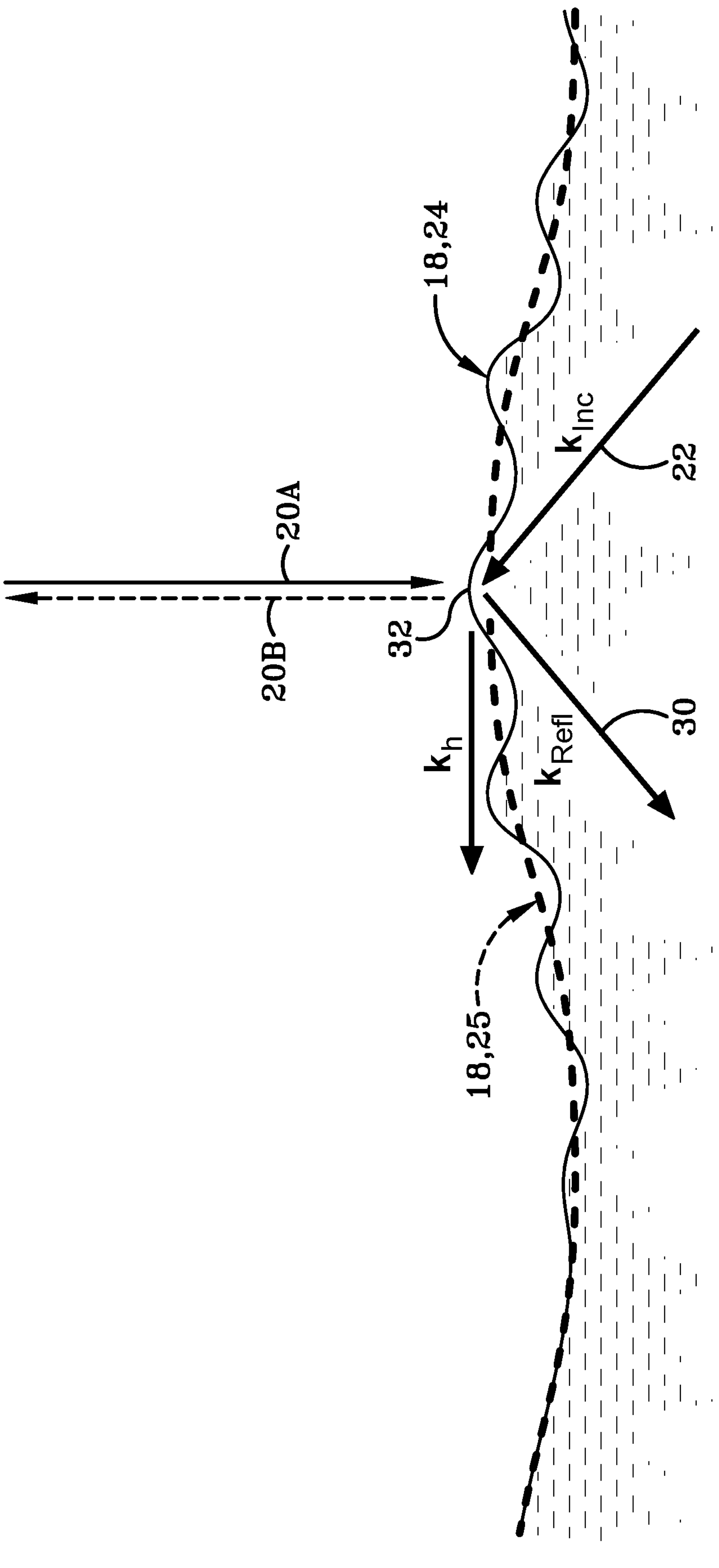
FIG. 4 (FIG. 4) is an enlarged diagrammatical view of the region labeled “SEE FIG. 4” in FIG. 1.

Navier-Stokes equations explain the acoustic waves 22, ambient gravity-capillary waves 25, and acoustically-driven surface waves 24. For simplicity, FIGS. 1-3 show the water surface 18 as generally flat relative to the ambient gravity-capillary waves 25. FIG. 4 shows the surface 18 as slightly wavy, including ambient gravity-capillary waves 25, upon which are superimposed the acoustically-driven surface waves 24. The present disclosure provides a technique to exploit these Navier-Stokes equations for a scenario that arises when subsurface or acoustic waves 22 drive the surface motion. The present disclosure quantifies the acoustically-driven motion versus incident acoustic sound pressure. The present disclosure details the differences in dispersion between the subsurface waves 22 (which may be sound waves or other types of waves moving through the ocean), the ambient gravity-capillary waves 25 (when surface 18 is wavy), and the acoustically-driven surface waves 24. Additionally, the present disclosure outlines the methods by which imaging interferometry can utilize the quantification of the acoustic waves 22 to identify the location of the sound source 12.

Although Navier-Stokes solutions have been applied to various engineering applications, they have not been applied to the detection and locating of underwater acoustic signals from above-surface platforms.

Parameters used in the equations detailed herein are defined in Table 1: Definitions.

TABLE 1

| Definitions | |
|---|---|
| u = (u, v, w) | velocity of a parcel of water |
| r = (x, y, z) | Spatial coordinate of a parcel of water Positive z is above surface, negative z is below the surface |
| $\zeta(x, t)$ | Height of the water surface at horizontal coordinate x = (x, y) and time t |
| $k = \hat{k}/\lambda$ | Direction vector of a wave |
| $\hat{k}$ | Unit vector in the direction of wave propagation |
| $g_0$ | gravitational constant at Earth's surface (9.8 m/s) |
| $\Phi = g_0 z$ | gravitational potential near the Earth's surface |
| $\rho$ | density of seawater (approximately 1024 Kg/m^3) |
| p, $p_A$ | Pressure, atmospheric pressure |
| f | Frequency of a wave |
| $\lambda$ | wavelength |
| $c_{Sound}$ | speed of sound, ~1493 m/s in seawater (varies a little with salinity and pressure) |
| $K = 1/(c_{Sound}$^2) | Bulk modulus of seawater (~4.5e−07 Kg/m^3/Pa) |
| $\tau$ | Surface tension of clean seawater (approximately 0.079 N/m) |

TABLE 1-continued

| Definitions | |
|---|---|
| $Dq/Dt = (\delta q/\delta t + q \cdot \nabla q)$ | Convective (motion-following) derivative of vector quantity q |
| $p_{Peak}$ | Peak sound-pressure level (SPL) in a sound wave |
| $u_{Peak}$ | Peak particle velocity in a wave |

The Navier Stokes equations are fluid-following formulations of Newton's law of motion and conservation of momentum. Newton's Law is:

$$\rho\frac{D}{Dt}u \equiv \rho\left(\frac{\partial}{\partial t}u + u\cdot\nabla u\right) = -2\rho\Omega\times u - \rho\nabla\Phi - \nabla p + (\nabla\cdot A)\cdot\nabla u, \quad \text{(Equation 1)}$$

$$\frac{\rho Du}{Dt} = \text{mass} * \text{acceleration}, \quad \text{(Equation 2)}$$

$$-2\rho\Omega\times u = \text{Coriolis force}, \quad \text{(Equation 3)}$$

$$-\rho\nabla\phi = \text{gravitational force}, \quad \text{(Equation 4)}$$

$$-\nabla p = \text{pressure gradient, and} \quad \text{(Equation 5)}$$

$$(\nabla\cdot A)\cdot\nabla u = \text{viscosity}. \quad \text{(Equation 6)}$$

The continuity equation (Conservation of mass) is given by:

$$0 = \left[\frac{D\rho}{Dt} + \rho\nabla\cdot u\right] = \left[\frac{\partial\rho}{\partial t} + (\nabla\rho)\cdot u + \rho\nabla\cdot u\right]. \quad \text{(Equation 7)}$$

Together, Equations (1) through (7) are known as the Navier-Stokes equations. They have both acoustic wave 22 and gravity-capillary-wave 25 solutions, which arise from different assumptions and boundary conditions. Acoustic wave 22 (or other subsurface waves) analyses typically neglects gravity, surface tension, and Coriolis forces; and considers the air-water surface to be rigid, with a water bottom that can be rigid or pliant. Gravity-capillary wave 25 analyses typically neglect fluid compressibility, viscosity, and the Coriolis forces and considers the air-water surface to be pliant with a water bottom that is rigid. The consequent particle motions are quite different, with acoustic waves 22 having longitudinal motions polarized in the direction of propagation, while gravity-capillary waves 25 produce motions circulating elliptically in a vertical plane. Stated otherwise, the motions of subsurface acoustic waves 22 differ from those of gravity-capillary waves 25. Both types of waves exist in reality, and can coexist simultaneously in the same body of water. Acoustically-driven surface waves 24 are also real and coexist with the others, though they have distinct dynamics. Different assumptions and boundary conditions yield other solutions of the Navier-Stokes equations, including acoustically-driven surface waves 24, exploitation of which is the topic of the present disclosure.

With respect to acoustic solutions, to show the basic acoustic-wave 22 mathematics, the present disclosure makes several simplifying assumptions: (1) All fluctuations from static pressures and velocities are due to the acoustic waves; (2) There are no salinity gradients; (3) Coriolis forces are ignored; (4) Heating by the sound waves can be ignored; (5) Linear acoustics: Pressure and velocity changes are approximated as small-perturbations relative to the static case (For acoustic waves, "small perturbation" means that all of the changes (relative the static case) in particle speed and density are due to the acoustic pressure, and that the changes in particle speed and density are so small that second-order and higher terms are much smaller than first-order terms. (in the sense of a Taylor-series expansion of effects). For example, if an equation has a term that depends on velocity, and another term that depends on velocity squared, the technique of the present disclosure can ignore the term that depends on velocity squared); (6) Gravity gradients can be ignored (working well-below the water surface); (7) At the frequencies and amplitudes that the present disclosure is concerned with, viscosity is small enough to ignore; and (8) water is only slightly compressible, so that density is a linear function of pressure; and (9) the last assumption, on compressibility, is expressed mathematically as a relationship between pressure and density:

$$\frac{\partial\rho}{\partial t} \approx K\frac{\partial p}{\partial t}. \quad \text{(Equation 8)}$$

With these assumptions, the Navier-Stokes equations become:

$$\rho\frac{D}{Dt}u \approx \rho\frac{\partial}{\partial t}u \approx -\nabla p, \text{ and} \quad \text{(Equation 9)}$$

$$-\nabla\cdot u \approx \frac{1}{\rho}\frac{\partial\rho}{\partial t} \approx \frac{K}{\rho}\frac{\partial p}{\partial t}. \quad \text{(Equation 10)}$$

Take the divergence of Equation (9) and substitute in Equation (10) to obtain a differential equation solely in pressure:

$$\nabla^2 p \approx -\rho\frac{\partial}{\partial t}\nabla\cdot u \approx K\frac{\partial^2 p}{\partial t^2} = \frac{1}{c_{Sound}^2}\frac{\partial^2 p}{\partial t^2}. \quad \text{(Equation 11)}$$

Solutions of Equation (11) are linear combinations of waves of the form:

$$P = p_{Peak}\times\cos(2\pi k\cdot r - 2\pi f t + \psi_0), \quad \text{(Equation 12)}$$

where $\psi_0$ is an arbitrary initial phase of the wave, and $$k = (1/\lambda)\hat{k}, \quad \text{(Equation 13)}$$

where $\hat{k}$ is a unit vector in the direction of wave propagation, and $\lambda$ is the acoustic wavelength. Substituting Equation (12) back into Equation (11) gives the dispersion relationship between acoustic frequencies and wavelengths:

$$f = c/\lambda \text{ (for acoustic waves).} \quad \text{(Equation 14)}$$

Substituting Equation (12) into Equation (10) and integrating over distance in the propagation direction gives the water particle velocities:

$$u = 1/(\rho c)\hat{k}p, \quad \text{(Equation 15)}$$

so that the peak velocity is related to the peak sound pressure level by:

$$u_{Peak} = 1/(\rho c)\hat{k}p_{Peak}. \quad \text{(Equation 16)}$$

Likewise, integrating the velocity over time in Equation (15) yields the water-particle displacements:

$$r = -1/(2\pi\rho fc)\hat{k}p_{Peak}\sin(2\pi k\cdot r - 2\pi ft + \psi_0), \quad \text{(Equation 17)}$$

with the peak displacement related to the peak SPL by:

$$r_{Peak} = -1/(2\pi\rho fc)\hat{k}p_{Peak}. \quad \text{(Equation 18)}$$

Equations (12) and (17) show that the particles displacements are out of phase with the sound pressure: peak pressure corresponds to zero displacement, and zero pressure corresponds to peak displacement. The displacements are also in the same direction as the sound-propagation direction.

With respect to ambient capillary-gravity surface wave 25 solutions, to show the basic mathematics, the present disclosure again assumes that viscosity and the Coriolis force are negligible. However, near the ocean surface 18, gravity cannot be ignored, since it provides the primary restoring force versus surface gravity-wave perturbations. Further, surface tension must also be considered as a restoring force for short-wavelength capillary waves.

With gravity included, instead of Equations (9) and (10), Equation (1) reduces to:

$$\rho\frac{\partial}{\partial t}u \approx -\rho g_0\hat{z} - \nabla p, \quad \text{(Equation 19)}$$

and Equation (2) becomes:

$$-\nabla\cdot u \approx \frac{1}{\rho}\frac{\partial\rho}{\partial t} = 0. \quad \text{(Equation 20)}$$

The assumption of incompressibility at the surface in Equation (2) is justified because water can move vertically into the air, changing the surface elevation §, rather than by compressing into neighboring water parcels. At the air-water interface, the pressure is constant at the atmospheric value ρA. (Unless otherwise stated, the pressures in this document are quoted relative to ρA.)

To obtain a differential equation in a single variable, first re-write Equation (19) in terms of gradients. To do so, the present disclosure introduces the water velocity potential ϕ, such that the velocity is:

$$u = \nabla\varphi. \quad \text{(Equation 21)}$$

Then, Equation (19) becomes:

$$\rho\nabla\chi = 0, \quad \text{(Equation 22)}$$

$$\text{where: } \chi = \left[\frac{\partial}{\partial t}\varphi + g_0(z+\xi) + \frac{1}{\rho}p\right]. \quad \text{(Equation 23)}$$

At the sea or ocean surface 18, inter-molecular forces create a surface tension. This surface tension, plus gravity, provides restoring forces versus surface deformation. Surface tension depends on surface curvature. Just below the sea or ocean surface 18, the pressure is the atmospheric pressure plus the surface tension: and is given by:

$$p(z=\xi) = p_A - \tau_S \times (\partial^2/\partial x^2 + \partial^2/\partial y^2)\xi. \quad \text{(Equation 24)}$$

Equation (24) constitutes a dynamic boundary condition at the ocean surface 18. Another boundary condition is the continuity of the sea or ocean surface 18 itself—meaning that water particles do not separate from the surface. (Note, the present disclosure is not concerned with conditions under which surface continuity is violated, such as an ultrasonic nebulizer.) The condition of surface continuity is expressed mathematically as:

$$\partial\xi./\partial t = \partial z/\partial t \equiv w = \partial\varphi/\partial z \text{ at the surface.} \quad \text{(Equation 25)}$$

Substituting Equation (24) into Equation (22) gives:

$$0 = \nabla\chi = \nabla[\partial\varphi./\partial t + g_0(z+\xi.) - (\tau_S/\rho)\times(\partial^2/\partial x^2 + \partial^2/\partial y^2)\xi.]. \quad \text{(Equation 26)}$$

Dealing with dynamic boundary conditions such as Equation (24) requires specialized mathematical methods, such as the Bernoulli Equations. To derive the Bernoulli equation for the surface waves consider a streamline 26 (FIG. 2) just below the sea or ocean surface 18, as shown in FIG. 2. Because 0=∇χ, the value of χ is constant:

$$\chi = \int ds\cdot\nabla\chi = \text{constant}, \quad \text{(Equation 27)}$$

where ds is a small segment of a path directed along a streamline. Thus the time derivative of χ is zero at the sea surface, so that $$0=\partial(\nabla\chi)/\partial t=\nabla\left[\partial^2\varphi./\partial t^2+g_0(\partial\xi./\partial t)-(\tau_S/\rho)\times(\partial^2/\partial x^2+\partial^2/\partial y^2)(\partial\xi./\partial t)\right].\quad\text{(Equation 28)}$$

Substituting Equation (25) into Equation (28) yields a differential equation for the velocity potential at the water surface:

$$0=\partial^2\varphi/\partial t^2+\left[g_0-(\tau_S/\rho)\times(\partial^2/\partial x^2+\partial^2/\partial y^2)\right]\partial\varphi/\partial z.\quad\text{(Equation 29)}$$

In addition to the dynamic surface boundary condition, there is also the boundary condition of zero vertical motion at the sea bottom 28. Solutions of Equation (29) that comply with all the boundary conditions have the form:

$$\varphi=\varphi_0\cos(2\pi k_h\cdot x-2\pi ft)\cosh[2\pi k_h(z+H)]/\cosh(2\pi k_hH).\quad\text{(Equation 30)}$$

Substituting Equation (30) into Equation (29) shows the magnitude of the horizontal wave component $k_h$ obeys the gravity-capillary dispersion relationship:

$$(2\pi f)^2=\left[(2\pi k_h)g_0-(2\pi k_h)^3\tau_s/p\right]\tanh(2\pi k_hH).\quad\text{(Equation 31)}$$

When environmental conditions are not calm, surface 18 typically is composed of a statistical superposition of multiple waves obeying (Equation 31), constituting the ambient gravity-capillary waves 25.

In Equation (31), the wave vector amplitude is $k_h=1/\lambda$).

The gravity-capillary wave dispersion relationship Equation (31) differs significantly from the acoustic wave 22 dispersion Equation (14). Most notably, the speeds $c=\lambda f$ of gravity-capillary waves 25 are much slower than those of acoustic waves 22, and depend on the wave frequency $f$, whereas acoustic-wave 22 speeds are nearly frequency independent.

To compute particle velocity, integrate Equation (30) along the direction of wave propagation:

$$u=\nabla\varphi=2\pi\varphi_0\begin{bmatrix}-k_h\sin(2\pi k_h\cdot x-\omega t)\\ \cosh(2\pi k_h(z+H))/\cosh(2\pi k_hH)\\ +\hat{z}k_h\cos(2\pi k_h\cdot x-\omega t)\\ \sinh(2\pi k_h(z+H))/\cosh(2\pi k_hH)\end{bmatrix}.\quad\text{(Equation 32)}$$

Finally, integrate the velocity over time to obtain particle displacement:

$$r=\xi_{max}\times\begin{bmatrix}-\hat{k}_h\cos(2\pi k_h\cdot x-2\pi ft)\cosh(2\pi k_h(z+H))/\cosh(2\pi k_hH)\\ -\hat{z}\sin(2\pi k_h\cdot x-2\pi ft)\sinh(2\pi k_h(z+H))/\cosh(2\pi k_hH)\end{bmatrix},\quad\text{(Equation 33)}$$

where $$\xi_{max}=\varphi_0k_h/f.\quad\text{(Equation 34)}$$

The ambient gravity-capillary wave 25 amplitude $\xi_{max}$ is statistically variable, and depends on environmental conditions such as wind speed and fetch (The term "fetch" is a sailing and oceanography term of art referring to the distance of open water over which a wind has blown steadily. The longer the fetch, the higher the waves. For example, a 10-knot wind over a deep pond will generate much smaller waves than a 10-knot wind over the length of Lake Michigan). Under very calm wind conditions, $\xi_{max}$ can be zero. Under windy or stormy conditions, the values of $\xi_{max}$ can be quite large.

As depicted in FIG. 3, and FIG. 4, with respect to acoustically-driven surface waves 24, because of the high acoustic impedance mismatch between air and water, an acoustic wave 22 incident on the sea or ocean surface 18 from below is almost totally reflected by the sea surface (i.e., reflected acoustic wave 30), with typically less than one one-millionth of the energy transmitted through the sea surface. To reflect the energy of wave 22 and still conserve momentum, the sea or ocean surface 18 must react by itself moving, as shown in FIG. 4 by reaction point 32. Reaction point 32 represents one site in the extended area upon which acoustic wave 22 impinges, exciting waves 24 for as long as the sound source is operating. The present disclosure estimates the order of magnitude of the motion by balancing the weight of a column of water against the incident pressure:

$$\xi_{max,estimated}=p_{max}/(g_0\rho).\quad\text{(Equation 35)}$$

For a 1-Pascal pressure difference (1-Pa equals 120 dB re 1 uPa), the corresponding displacement amplitude is 100 microns at reaction point 32. Micron-scale surface modulations at reaction point 32 are too small to be significant for acoustic detection, but are large compared to the wavelength of light, so that microscopic motions may be detectable via optical interferometry via laser beam 20A and reflected beam 20B.

The Bernoulli equation, together with boundary conditions, is also used to quantify the properties of acoustically-driven surface wave 24. The total pressure at the surface will be the sum of the incident, reflected, and gravity waves, as illustrated in FIG. 3.

FIG. 3 depicts that the present disclosure can consider an undisturbed water surface with an acoustic wave 22 incident from below at an angle $\theta_I$ relative to the horizontal, and a reflected acoustic wave 30 at an angle $\theta_R$ relative to the horizontal. The incident wave propagates with the sum of the acoustic pressures of the incident acoustic wave 22 and reflected waves 30.

Because the Bernoulli equation (29) is in terms of the velocity potential, the present disclosure re-writes the acoustic wave 22 Equation (12) in terms of velocity potential. Combine Equation (12) and (15) to obtain the velocity u in terms of pressure, then invert Equation (21) by integrating u along the direction of wave propagation k to obtain the velocity potential $\varphi_I$ for the incident acoustic pressure wave:

$$\varphi_1=\varphi_{peak,Inc}\times\cos(2\pi k_{Inc}\cdot r-2\pi ft).\quad\text{(Equation 36)}$$

In Equation (36), the peak velocity potential is related to the peak sound pressure by:

$$\varphi_{peak,Inc} = \lambda/(2\pi\rho c)p_{Peak,Inc} = 1/(2\pi\rho f)p_{Peak,Inc}. \quad \text{(Equation 37)}$$

Because the initial phase wo is arbitrary, the present disclosure is free to choose it at any convenient value for the incident acoustic wave 22 so that Equation (36) and Equation (12) are equivalent to each other.

The reflected acoustic wave 30 will have a form similar to Equation (36):

$$\varphi_{Refl} = \varphi_{peak,Refl} \times \cos(2\pi k_{Rrfl} \cdot r - 2\pi f t). \quad \text{(Equation 38)}$$

The total velocity potential is the sum of incident acoustic wave 22 and reflected acoustic wave 30, modulated by the reaction of the ocean surface 18 at reaction point 32. Near the sea surface, the Bernoulli Equation has both propagating and decaying transient solutions. In response to an excitation such as an acoustic wave, the vertical component in Equation (30) includes an exponentially decaying term as well, so that the total velocity potential is:

$$\varphi_{Total} = [\varphi_{peak,I} \times \cos(2\pi k_I \cdot r - 2\pi ft) + \varphi_{peak,R} \times \cos(2\pi k_R \cdot r - 2\pi ft)] \times F(z), \quad \text{(Equation 38)}$$

where:

$$F(z) = \exp(z/z_D)\cosh[2\pi k_h(z+H)]/\cosh(2\pi k_h H). \quad \text{(Equation 39)}$$

In Equation (39), $z_D$ is an exponential-decay depth, a depth over which the acoustically-driven surface-wave 24 vertical displacement attenuates to 1/e. Also, $k_h$ is the horizontal portion of the incident vector $k_{Inc}$. The magnitude of the horizontal component is:

$$k_h = k_{Inc} \times \cos\theta_{Inc} = \cos\theta_{Inc}/\lambda_{Inc} \quad \text{(Equation 40)}$$

Equation (38) satisfies the boundary condition at the ocean surface 18, Equation (29), if the vertical components of the vectors $k_{Inc}$ and $k_{Refl}$ are equal and opposite, and if their horizontal components $k_h$ are equal. This is the well-known “angle of incidence=angle of reflection” condition. Thus, the total velocity potential in response to an acoustic excitation of the ocean surface 18 at reaction point 32 is:

$$\varphi_{Total} = 2\varphi_{peak,Inc} \times \cos[2\pi(k_h \cdot x - ft)] \times F(z). \quad \text{(Equation 41)}$$

Equation (41) describes the dynamics of the acoustically-driven surface wave 24.

The factor of two in Equation (41) shows that adding the reflected wave 30 to the incident acoustic wave 22 doubles the acoustic pressure just beneath the surface 18.

Substituting Equation (38) and (39) in to Equation (29) yields:

$$0 = 2\varphi_{Peak,Inc}\cos(2\pi(k_h \cdot x - ft)) \left\{(2\pi k_h \tanh(2\pi k_h H) + 1/z_D)\left[g_0 + \frac{1}{\rho}\tau_s(2\pi k_h)^2\right] - (2\pi f)^2\right\} \quad \text{(Equation 42)}$$

Equation (42) is satisfied for all times t and surface loci x only if the decay depth $z_D$ obeys the relationship:

$$z_D = \frac{\left[g_0 + \frac{1}{\rho}\tau_s(2\pi k_h)^2\right]}{\left\{(2\pi f)^2 - 2\pi k_h \tanh(2\pi k_h H)\left[g_0 + \frac{1}{\rho}\tau_s(2\pi k_h)^2\right]\right\}} \approx \frac{g_0}{\{(2\pi f)^2 - 2\pi g_0 k_h \tanh(2\pi k_h H)\}} \approx \frac{g_0}{(2\pi f)^2} \quad \text{(Equation 43)}$$

Equation (43) shows that ambient gravity-capillary waves 25, which obey Equation (31), have an infinite value of $z_D$, and so they can propagate freely. Acoustically-driven surface waves 24 excited at acoustic wavelengths and frequencies, on the other hand, decay exponentially with depth, with a frequency-dependent decay length. This exponential decay is the pressure release mechanism relieving the acoustic pressure to match the atmospheric pressure at the water or ocean surface 18 at reaction point 32. At typical acoustic frequencies of 100 Hz to 1000 Hz, $z_D$ is much smaller than the wavelength of sound. For example, in deep water, $z_D$(100 Hz)=25 microns, and $z_D$(1000 Hz)=0.25 microns. These depths are sensible by optical interferometry, but far too small for direct acoustic measurement. (Deep water is water for which $k_h H \gg 1$.)

With respect to particle displacements versus sound pressure level substituting Equation (41) for the velocity potential into Equation (21) and integrating along the wave-propagation direction gives the particle velocities, then integrating over time gives the displacements. Unlike longitudinal acoustic waves, the acoustically-driven surface displacements are nearly transverse. In deep water and at frequencies for which Equation (43) reduces to:

$$z_D \approx \frac{g_0}{(2\pi f)^2}, \quad \text{(Equation 44)}$$

the displacements are $$r(z=0) = 2\left(\frac{p_{Peak,Inc}}{2\pi\rho fc}\right)\left\{\begin{matrix} \hat{k}_h \cos\theta_I \cos(2\pi(k_h \cdot x - ft)) \\ -\hat{z}\left[\frac{1}{g_0}2\pi fc - \sin\theta_{Inc}\right]\sin(2\pi(k_h \cdot x - ft)) \end{matrix}\right\}. \quad \text{(Equation 45)}$$

Because of the surface-continuity condition Equation (25), the sea-surface displacement ¿ equals the vertical particle displacements in Equation (45), so that:

$$\xi(x, t) = \xi_{Max}\sin[2\pi(k_h \cdot x - ft)], \quad \text{(Equation 46)}$$

where $$\xi_{Max} = 2\left(\frac{p_{Peak,Inc}}{2\pi\rho fc}\right)\left[\frac{1}{g_0}2\pi fc - sin\theta_{Inc}\right] \approx 2\left(\frac{p_{Peak,Inc}}{g_0\rho}\right), \quad \text{(Equation 47)}$$

where $c=\lambda f$ is the speed of sound in water. Equation (47) shows that the water vertical displacement at reaction point 32 equals twice the initial estimate given by Equation (35). At small incidence angles, the displacements are also independent of frequency, and are determined solely by the incident sound pressure level $\rho_{Peak,\ Inc}$. The displacements propagate with the acoustic wave 22 along the ocean surface 18 at an apparent speed of:

$$c_{Apparent} = \lambda f / \cos(\theta_{Inc}). \quad \text{(Equation 48)}$$

The ratio of $c_{Apparent}$ to the speed of sound $c_{Sound}$ in water gives the cosine of the depression angle towards the sound source.

Having thus described the equations, reference is now made to exploiting the equations according to exemplary methods of the present disclosure. Non-contact detection of acoustic waves 22 in the ocean is a highly desirable capability for marine biology, fisheries management, ship-traffic monitoring, underwater seismology, military defense and other applications. At typical open-ocean acoustic SPLs, the amplitudes given by Equation (47) are microscopic. For example, a 1 Pa (120 dB re 1 μPa) SPL yields an amplitude $\xi_{Max}$ of just 200 microns. The small amplitudes complicate non-contact discrimination of acoustically-driven waves from the ambient gravity-capillary wave 25 background. Optical interferometry, via shearography apparatus 14, is one of the few methods capable of remotely sensing micron-scale ocean surface 18 elevation changes. For an ocean surface 18 free of ambient gravity-capillary waves 25, point-sensing methods such as laser Doppler vibrometry (LDV) can use specular (glint-like) reflections from the sea surface to see the vibrations described by Equation (46). However, the use of point-sensing interferometry fails in all but the calmest seas, since the natural ambient ocean gravity waves 25 have much greater amplitudes.

The sensing method which overcomes the limitations of point interferometry has the features of time-resolved area-imaging interferometry, and ability to exploit non-glint diffuse reflectance. Time-resolved area-imaging interferometry creates interferometric "movies" of a scene, showing the microscopic changes caused by reaction points 32 in the scene of the ocean surface 18. This exploits the dispersion relationship (wave frequency versus wavelength). Gravity-capillary waves 25 move relatively slowly, so that they appear to be nearly frozen as an acoustic wave 22 moves along the ocean surface 18, inducing acoustically-driven surface waves 24. In addition, the wavelengths of acoustic waves 22 and acoustically-driven surface waves 24 are much longer than those of ambient gravity-capillary waves 25 of the same frequency, allowing many pixels of the image to be averaged to boost the acoustically-driven surface wave signal. Due to the slow moving speed of the gravity-capillary wave 25, the exploitation techniques effectively ignore or nullify the gravity-capillary waves 25 when determining or executing the calculation techniques to observe the motion of the acoustically driven surface waves 24. In this sense, the gravity capillary waves 25 are disregarded. In other instances, the techniques presented herein may still disregard movement of the gravity capillary waves 25, such filtering them out, even if the application specific needs measures them.

Even with time-resolved area imaging, the relative sparsity of glints leads to a sparsity of data for sensing and discriminating acoustic signals. The data-sparsity problem is overcome by exploiting patches of foam and other diffuse reflectors on the sea surface, as well as by exploiting both surface reflectance and subsurface backscatter.

A technology which provides the desired features is time-resolved laser interferometric area-imaging system, of which shearography apparatus 14 is one example, operated at frame rates and fields of view that can exploit the differences between the ambient gravity-capillary wave 25 dispersion of Equation (31) and the acoustically-driven surface wave 24 dispersion Equation (48). Table II shows some relevant frequencies, wavelengths, and speeds for the two types of waves 22, 24 in deep water. Interferometry is an ideal exploitation method because the wavelength of light allows microscopic surface-elevation changes to provide detectable signals in interferograms. (An interferogram is an image created by interfering two or more sources of coherent or partially-coherent light.)

As shown in Table II, the gravity capillary waves 24 at the frequencies shown are nearly stationary and have vastly shorter wavelengths than acoustic waves 22 of the same frequency.

TABLE II

Dispersion Properties of Surface Acoustic and Gravity-Capillary Waves

| | Ambient Gravity-Capillary Waves | | Acoustically-Driven Surface Waves | | |
|---|---|---|---|---|---|
| Frequency (Hz) | Wave Speed (m/s) | Wave Length (m) | Wave Speed (m/s) | Wave Length (m) | Amplitude @ 120 dB re 1 μPa |
| 50 | 0.00063 | 0.031 | 1500 | 30 | 200 microns |
| 100 | 0.015 | 0.00015 | 1500 | 15 | 200 microns |
| 200 | 0.0079 | 0.00004 | 1500 | 7.5 | 200 microns |
| 500 | 0.0031 | 0.000063 | 1500 | 3 | 200 microns |

An exemplary embodiment uses an airborne laser interferometric imager of shearography equipment 14 to collect a set of interferometric images with the following properties: (1) temporal rates fast enough to Nyquist sample the frequencies of interest; (2) spatial sampling fine enough to Nyquist sample the acoustic wavelengths of interest; (3) field of view large enough to image a wavelength of sound at the frequencies of interest; (4) optical radiation wavelengths short enough to sense optical-phase changes produced by the acoustic amplitudes at the frequencies and SPLs of interest.

The processing method computes optical-phase differences between successive frames, and filters over time and space for disturbances which match the acoustic dispersion, and reject those which match gravity-capillary dispersions. The exemplary method is self-reference interferometry, such as shearography, but other imaging interferometry methods may also be used.

Figure 5A:
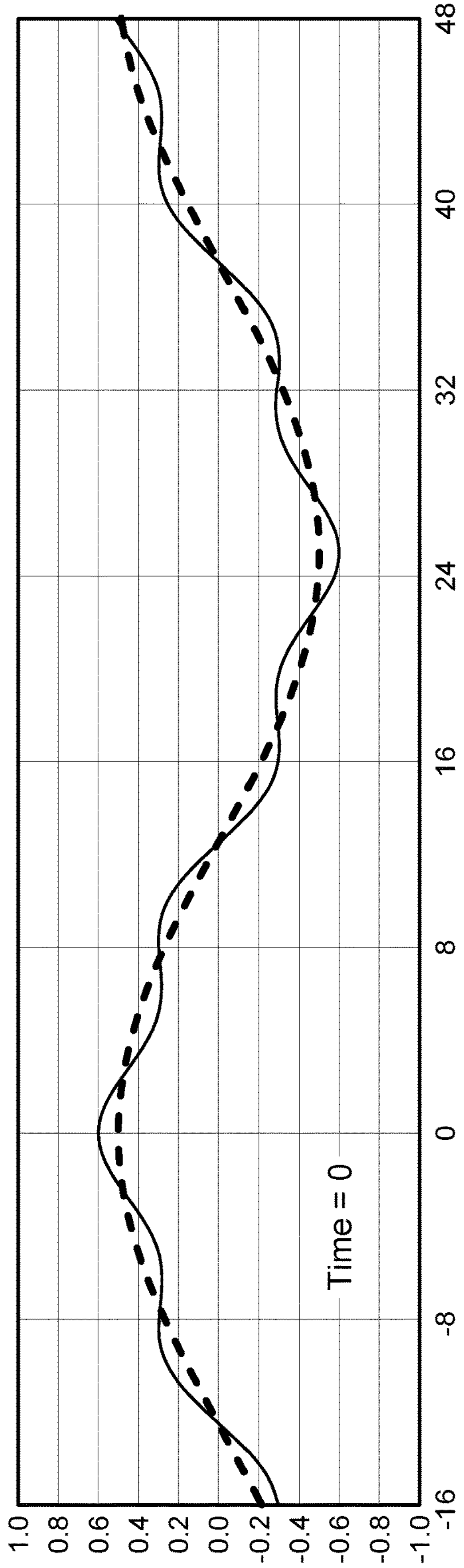
FIG. 5A (FIG. 5A) is a graph depicting the positioning of the acoustically driven surface wave relative to the gravity capillary surface wave at a first time (T=0).
Figure 5B:
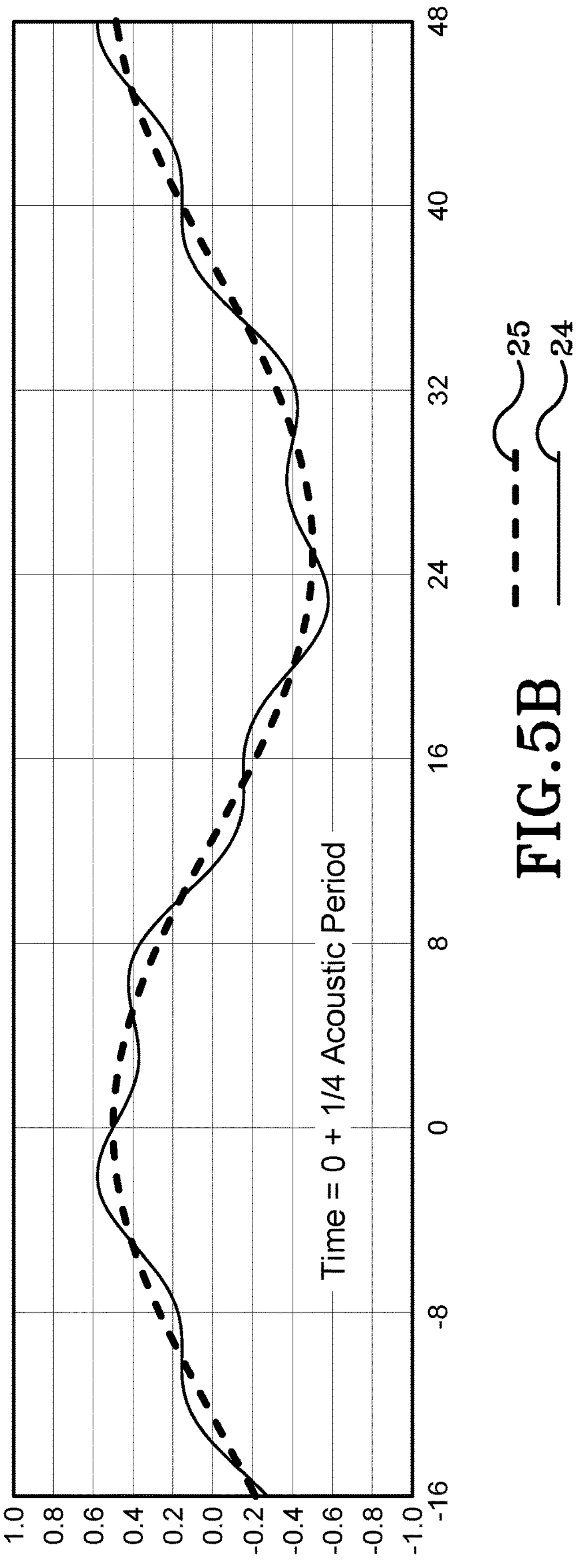
FIG. 5B (FIG. 5B) is a graph depicting the positioning of the acoustically driven surface wave relative to the gravity capillary surface wave at a time that is ¼ Acoustic Period from the first time (T=0+¼ Acoustic Period).
Figure 5C:
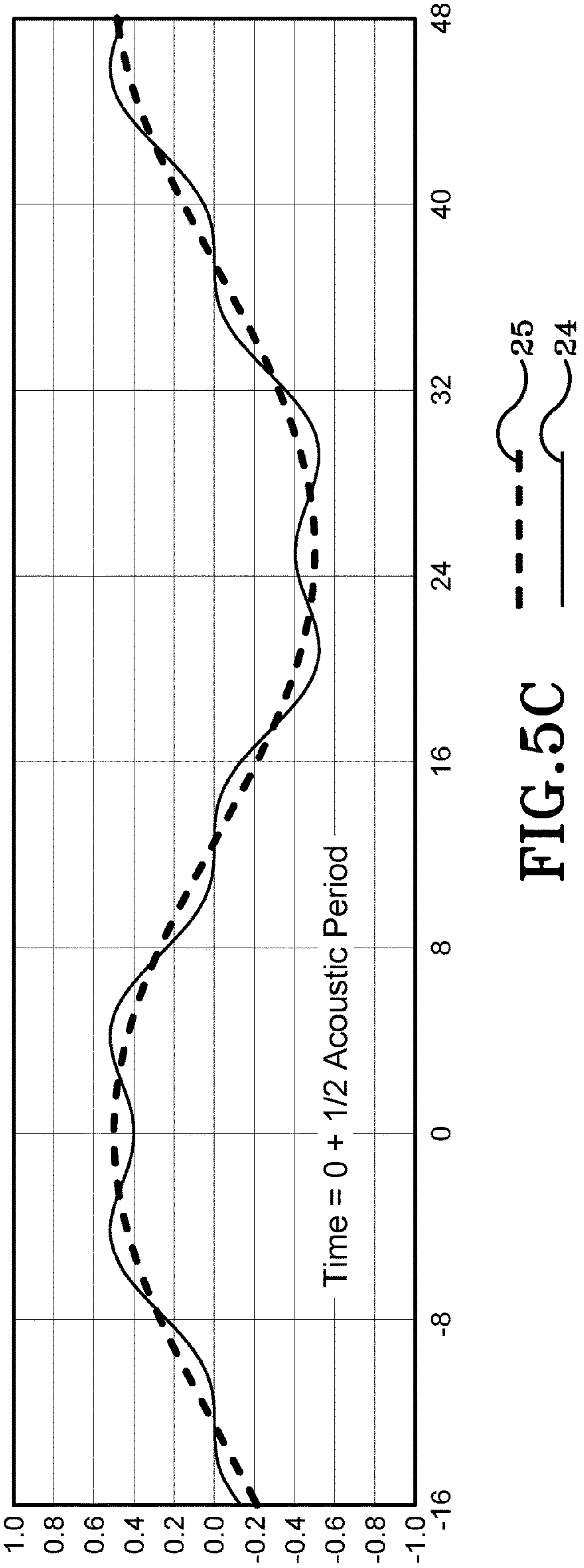
FIG. 5C (FIG. 5C) is a graph depicting the positioning of the acoustically driven surface wave relative to the gravity capillary surface wave at a time that is ½ Acoustic Period from the first time (T=0+½ Acoustic Period).
Figure 5D:
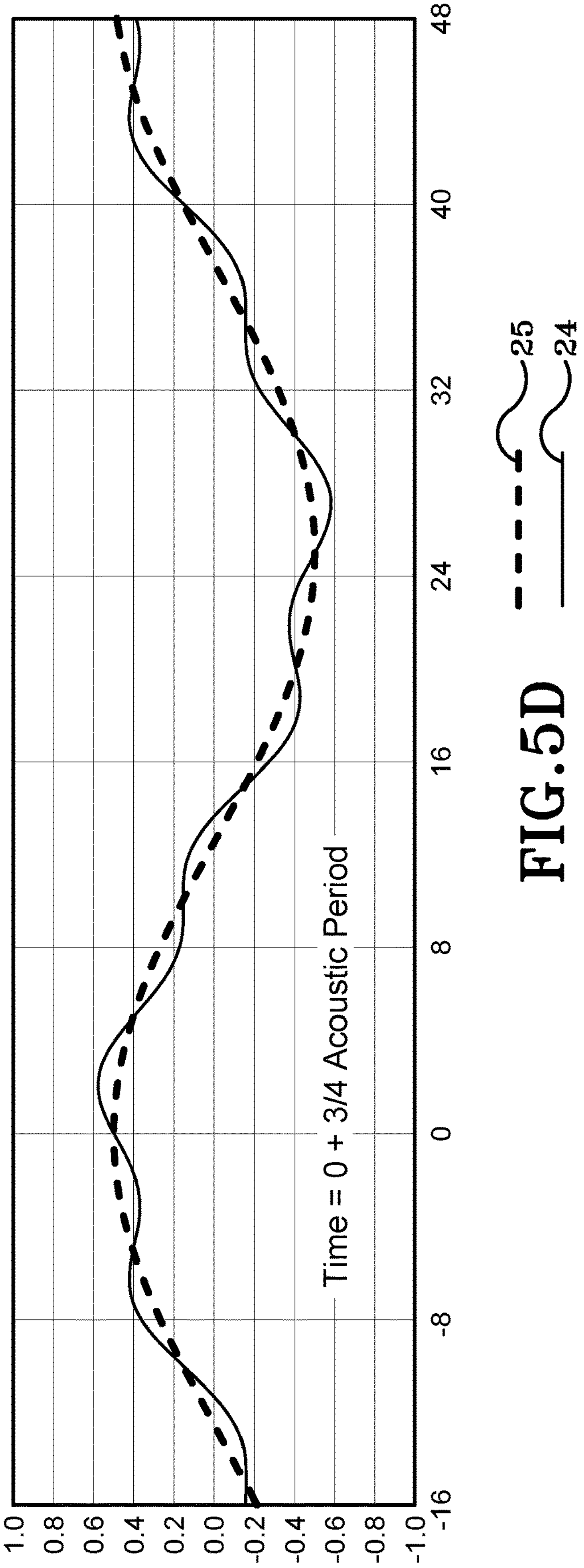
FIG. 5D (FIG. 5D) is a graph depicting the positioning of the acoustically driven surface wave relative to the gravity capillary surface wave at a time that is ¾ Acoustic Period from the first time (T-0+¾ Acoustic Period).
Figure 5E:
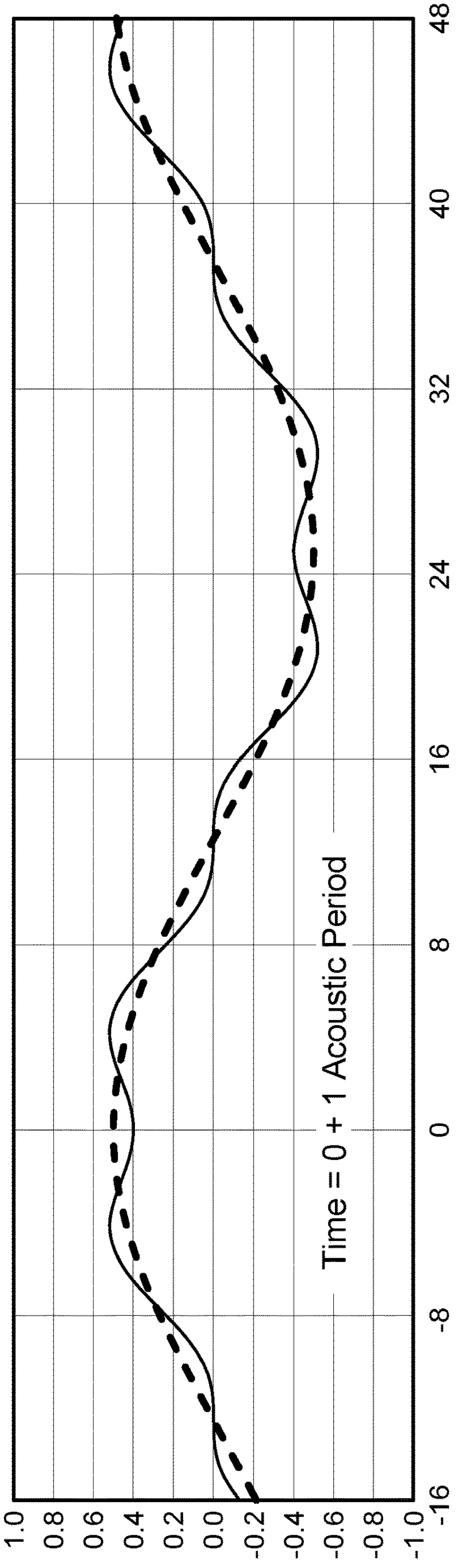
FIG. 5E (FIG. 5E) is a graph depicting the positioning of the acoustically driven surface wave relative to the gravity capillary surface wave at a time that is 1 Acoustic Period from the first time (T=0+1 Acoustic Period).
Figure 5E:

FIG. 5A-FIG. 5E are diagrammatic graphs depicting the acoustically driven surface wave 24 and the gravity capillary surface wave 25. The graphs collectively show the movement of the acoustically driven surface wave 24 over one acoustic period relative to the gravity capillary surface wave 25 that remains relatively or nearly stationary given the drastic speed differential between acoustically driven surface wave 24 and the gravity capillary surface wave 25. FIG. 5A represents the positioning of the acoustically driven surface wave 24 relative to the gravity capillary surface wave 25 at a first time (T=0). FIG. 5B represents the positioning of the acoustically driven surface wave 24 relative to the gravity capillary surface wave 25 at a time that is ¼ Acoustic Period from the first time (T=0+¼ Acoustic Period). FIG. 5C represents the positioning of the acoustically driven surface wave 24 relative to the gravity capillary surface wave 25 at a time that is ½ Acoustic Period from the first time (T=0+½ Acoustic Period). FIG. 5D represents the positioning of the acoustically driven surface wave 24 relative to the gravity capillary surface wave 25 at a time that is ¾ Acoustic Period from the first time (T=0+¾ Acoustic Period). FIG. 5E represents the positioning of the acoustically driven surface wave 24 relative to the gravity capillary surface wave 25 at a time that is 1 Acoustic Period from the first time (T=0+1 Acoustic Period).

Another exploitation for the present disclosure can utilize a system that is different than shearography to obtain the characteristics of the water surface based on optical tactics. Recall, shearography looks for differences based on at least two points on a surface that are interfered together. Essentially, these other devices described herein are self-referencing interferometric in as much as the light waves or laser beams 20A are experiencing the same platform motion, almost the same atmosphere, and other affects that are affectively cancelled out, and all that remains are the effects of the ocean surface. Thus, the other embodiments described herein are self-referencing by two points that are spatially separated.

Another embodiment of the present disclosure may perform vertical self-referencing, where every pixel is its own reference. Recall, airborne optical laser interferometry, compares the optical phase of the reflected sensing laser to an optical reference in order to measure small changes in optical path. Many standard interferometry methods, such as laser Doppler vibrometry (LDV) use a local oscillator—a laser beam that never exits the aircraft. Mixing the light from the sensing laser with the local oscillator produces an interference signal. The disadvantage of using a local oscillator is that the sensing laser can experience many sources of extraneous phase shift, such as altitude variations, aircraft vibrations, and atmospheric turbulence. Because the local oscillator does not experience the same extraneous phase shifts, the resulting interference signal includes them, and they can mask or confound the true signal from the surface being sensed.

Self-referencing interferometry constructs a relative-phase reference from the outgoing laser beam itself. Shearography is one such self-referencing method, mixing a laser-illuminated image with a horizontally-displaced image illuminated by the same laser. Because both images experience the same aircraft motions and atmospheric turbulence layers, those extraneous phase shifts are common to both images and automatically cancel out. This allows detection of microscopic acoustically-induced surface motions. The drawback to shearography is that the signal levels from the sensed and reference points may have very different magnitudes, reducing the contrast of the resulting phase image.

This embodiment of the present disclosure provides another self-referencing system and method specific to monitoring transparent and translucent vibrating interfaces between two media: vertical self-referenced interferometric imaging. Vertical self-referencing exploits the refractive index of water and the presence of scatterers to provide a subsurface phase reference.

Figure 6A:
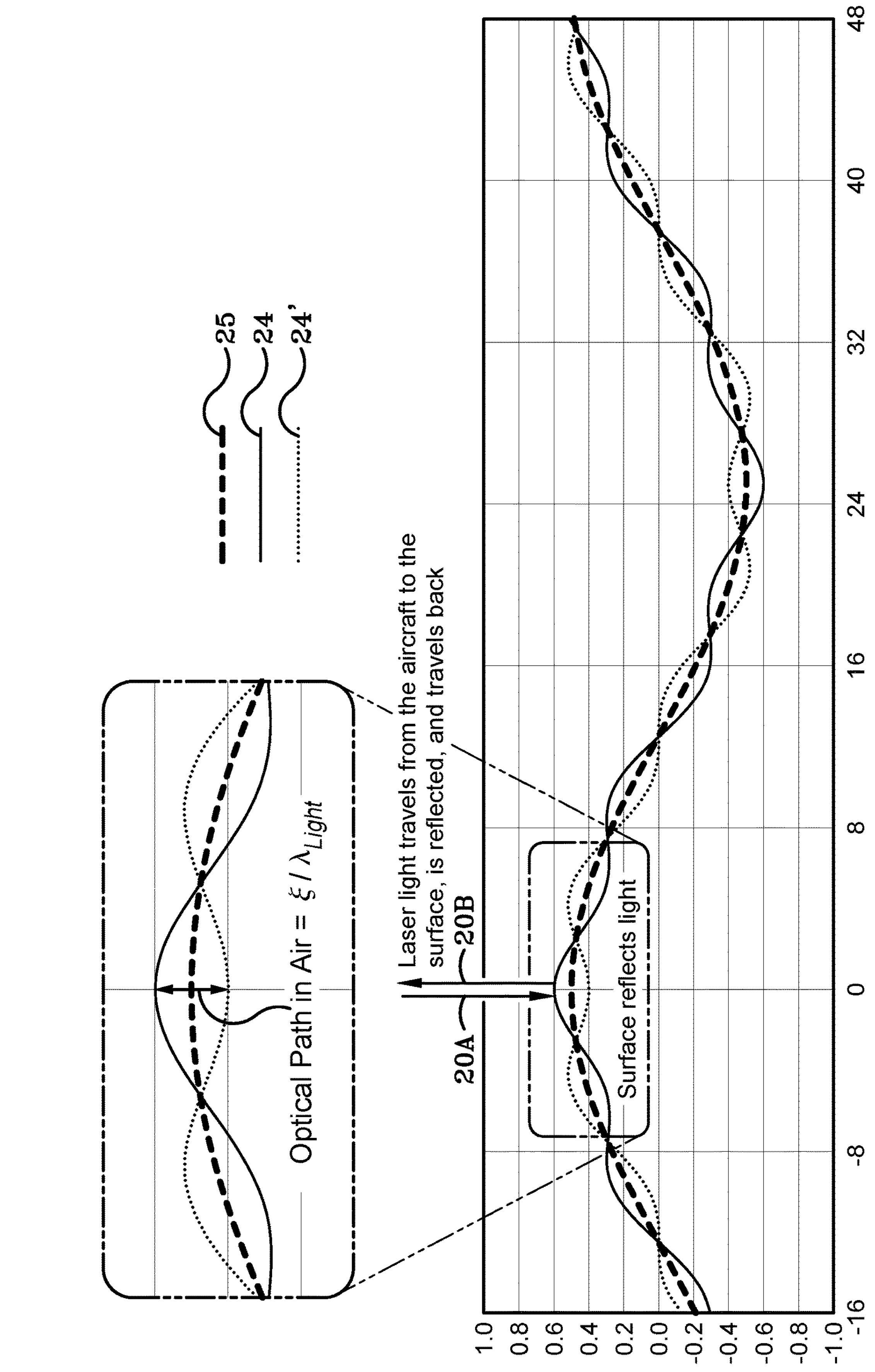
FIG. 6A (FIG. 6A) is a graphical diagram depicting a maximum signal that can be obtained from the water surface at T=0.
Figure 6B:
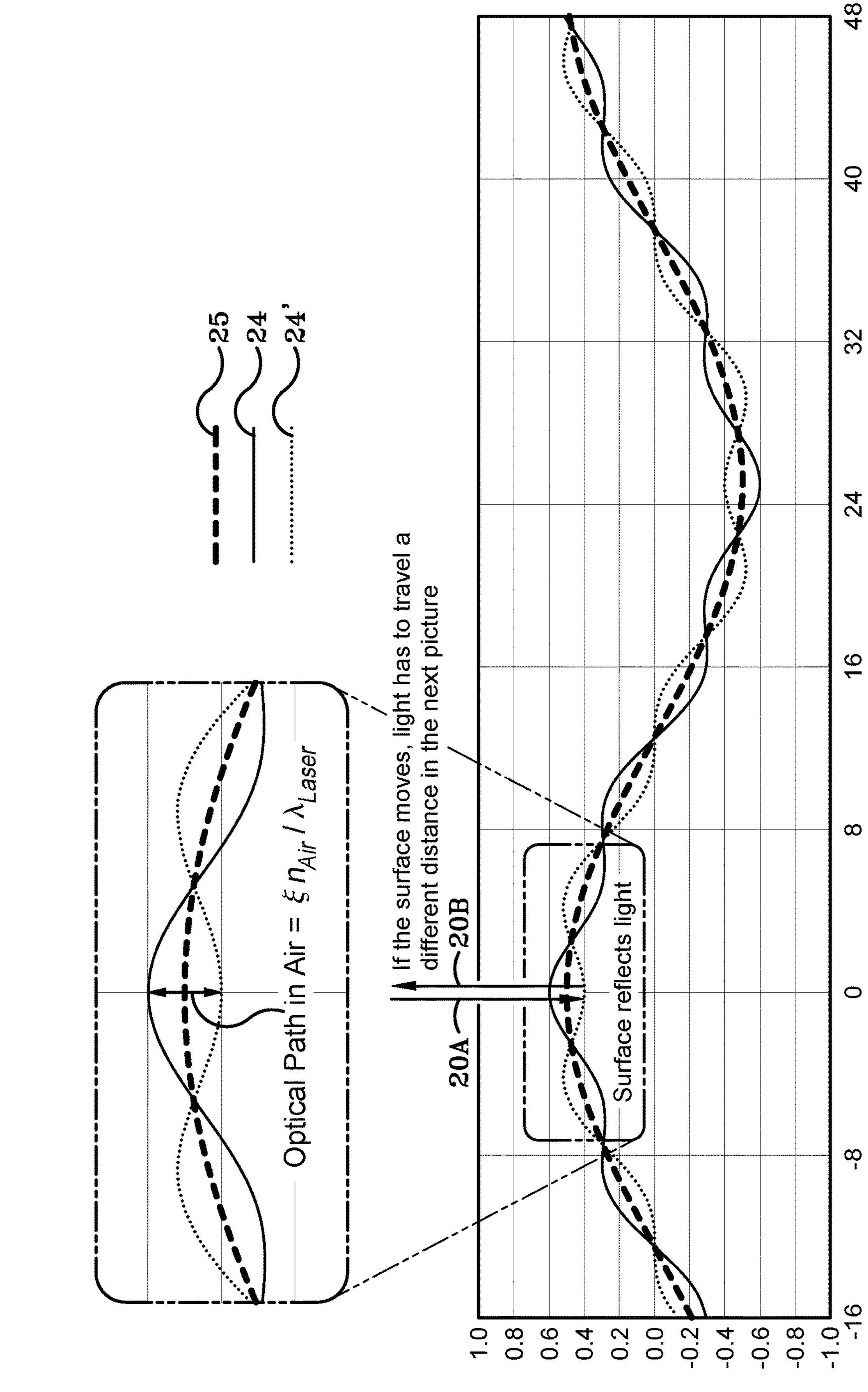
FIG. 6B (FIG. 6B) is a graphical diagram depicting a maximum signal that can be obtained from the water surface at T=0+½ Acoustic Period.
Figure 6C:
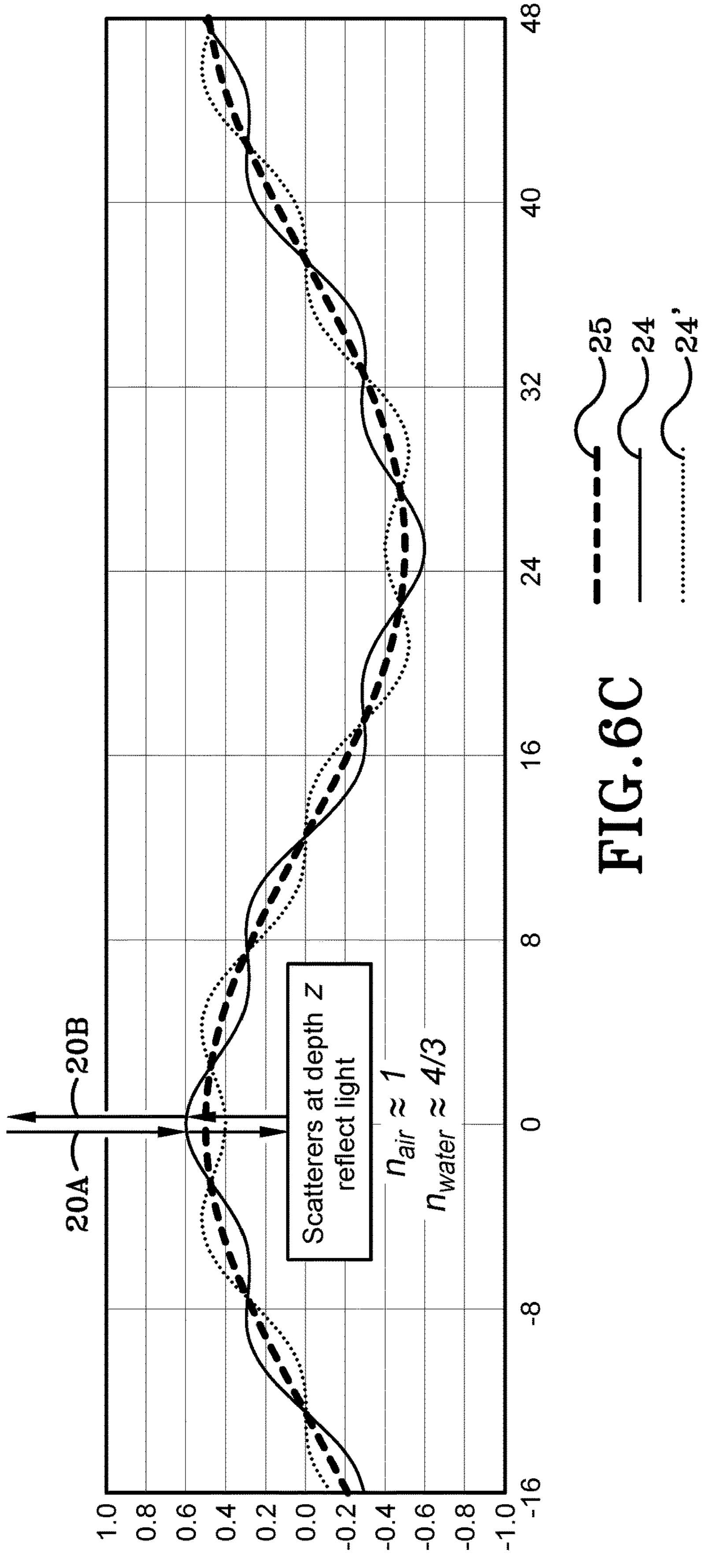
FIG. 6C (FIG. 6C) is graphical diagram depicting a maximum signal that can be obtained from below the surface of the water.

FIG. 6A, FIG. 6B, and FIG. 6C are graphs that diagrammatically depict beam 20A interacting with the surface of water 18. FIG. 6A represents beam 20A traveling from platform 12 to surface of water 18 and reflecting the reflected beam 20B. In FIG. 6A-6C, reference element 24' represents the surface of one half of a period later of the acoustically driven surface wave 24.

FIG. 6A depicts an acoustic excitation that moves the sea surface or water 18 periodically with an amplitude $\xi$ that ranges from $\xi_{Max}$ to $+\xi_{Max}$ produces a maximum phase difference for laser light reflected from the surface of $2\,\xi_{Max}\,\eta_{Air}/\lambda_{Laser}$. The two-way propagation of light from the aircraft to the water surface and back doubles that phase again, so that the exploitable phase difference for the surface alone is:

$$\Delta\Phi_{Air\_Only} \approx 4\xi_{Max}/\lambda_{Laser}. \qquad \text{(Equation 49)}$$

FIG. 6B depicts that $\eta_{Air}\approx 1$, which is the index of refraction of air. If the surface is transparent, light propagating to a depth z experiences less of a phase shift: The optical path from the surface to depth z is $[-\xi\eta_{Air}+(z+\xi)\,\eta_{water}]/\lambda_{Laser}$. Since the index of refraction of water $\eta_{Water}\approx 4/3$, the optical path is approximately $(-\xi\eta_{Air}+(z+\xi)\,\eta_{Water})/\lambda_{Laser}$. As the surface vibrates, the difference between the minimum and maximum phase shift over the two-way path from air to depth z is thus:

$$\Delta\Phi_{Water\_only} = 2\times\left[2\xi_{\mathrm{Max}}(n_{water}-n_{air})/\lambda_{Laser} \approx (4/3)\xi_{Max}/\lambda_{Laser}. \qquad \text{(Equation 50)}$$

That is, the exploitable phase shift is ⅓ of what it would be from the surface alone. Thus, comparing a laser-illuminated image from the surface to one containing only subsurface-reflected light allows an exploitable phase of:

$$\Delta\Phi_{Water\_andd\_Air} = (8/3)\xi_{\mathrm{Max}}/\lambda_{Laser}. \qquad \text{(Equation 51)}$$

The advantage of accepting the reduced signal in Equation 51 is that many more pixels are exploitable, because this embodiment does not need lucky coincidences of simultaneous good signals from horizontally-separated pixels.

FIG. 6C depicts that the maximum optical path difference is approximately 3× less below the surface of water 18. Optical path to depth z and back is $2\times(z\eta_{water}+\xi(\eta_{water}-\eta_{air})]/\lambda_{Laser})$. Thus, the net exploitable optical phase change is $2\xi_{Max}\,(\eta_{water}-\eta_{air})]/\lambda_{Laser}\approx(2/3)\xi_{Max}/\lambda_{Laser}$.

Vertical self-referencing is accomplished by mixing images from two different distances from the camera. For acoustically-induced surface wave sensing, one image is of the water surface, and the other image is from below the surface. The distances are determined by the time of flight of a laser pulse leaving the system, transiting to the desired range, then being reflected back to the system. The time gate of the system sets the span of times for an image. A range gate is the span of depths from which pulsed-laser-light is reflected by a during the time gate. The range gate is related to the time gate by the speed of light. A clock starts when the first laser pulse is transmitted, and the camera or receiver 128 exposure turns on when the first pulse returns from the top of a desired range of depths, then off when the pulse returns from the bottom of the desired range. By this mechanism, the first pulse or portion 120-1 provides an image of a sub-surface slice of water from a defined depth range. Similarly, a second pulse or portion 120-2 transmitted later than the first pulse will provide an image of a shallower depth range in the same range gate, simultaneous with the first image. Simultaneous imaging is required for the optical interference pattern to form.

The time between the transmission of pulse 1 (i.e., first portion 120-1 in FIG. 7) and pulse 2 (i.e., second portion 120-2 in FIG. 7) determines the depth separation of the received images. Because the speed of light in water is approximately 0.224 meters per nanosecond, suitable pulse separations are on the order of several nanoseconds. The two coherent laser pulses can be generated in a variety of ways, such as by a pair of common-seeded pulsed lasers, by splitting a single pulse into two via a beam splitter, or by generating squeezed light pairs. One embodiment is shown, using a beam splitter to create two pulse and optical delays to time-shift one pulse relative to the other. Because the surface and subsurface images may have different reflectances, the beam splitter may be designed with an uneven split—for example 90% to the first pulse and 10% to the second, to make the received intensities similar in brightness.

Because the laser images have the same wavelength and arrive at the receiver simultaneously, they interfere with each other. This interference manifests as a laser speckle pattern combined with an ordinary image of the water. The speckle pattern will depend on optical path differences, and include persistent random components. Vibrations of the surface will induce non-random changes in the speckle pattern over one to ten milliseconds for acoustic frequencies of 100-1000 Hertz. By subtracting successive images of the surface acquired within milliseconds, the ordinary image of the surface and the persistent random speckle will be eliminated, leaving only the signal from the vibrating surface. Analyzing a series of such difference images (an interferometric movie) enables identification of acoustically-induced surface waves, and determination of their direction, the depression angle to the sound source, and other characteristics of interest.

A complication for the system design is that laser light decoheres as it propagates in water. The decoherence length equals approximately one-half of a scattering length, corresponding to a typical distance of two to five meters for visible light. Thus, best contrast occurs if the subsurface image contains only light from within the decoherence length.

Figure 7:
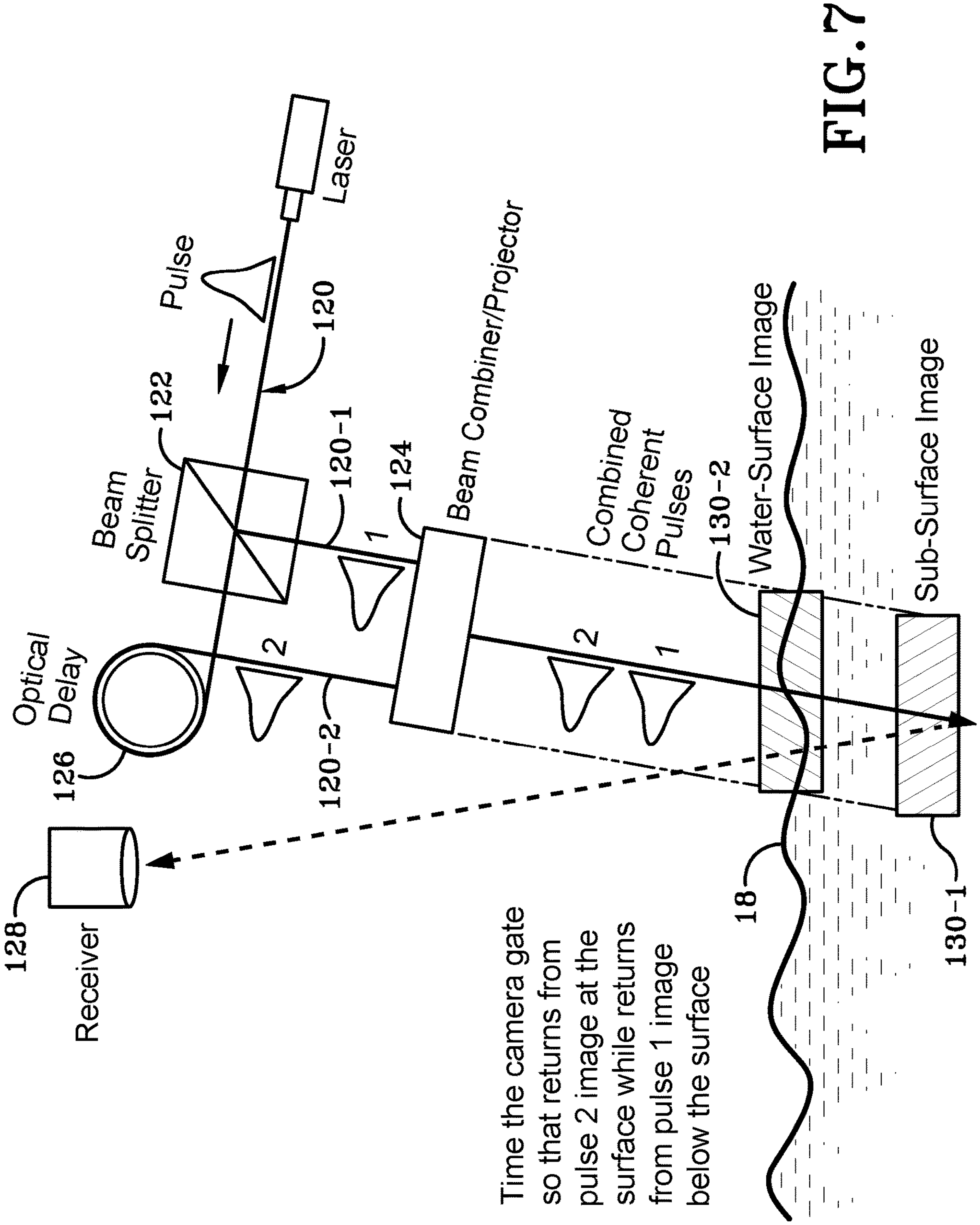
FIG. 7 (FIG. 7) is an operational diagrammatic view of a system according to an exemplary embodiment of the present disclosure Similar numbers refer to similar parts throughout the drawings.

FIG. 7 depict the operation of an exemplary system in which at least two laser beans projected from the platform. The laser beams may be generated as a single beam 120 may be split at a beam splitter 122. A first portion 120-1 the laser beam 120 is sent straight towards water 18 from the beam projector 124. The portion 120-1 of the laser beam 120 may be a fraction, such as 8/9, 7/8, 6/7, 5/6, 4/5, 3/4, 2/3, or 1/2, or any percentage less than 100%, of the laser beam. The remaining light is directed to a second portion 120-2 which may be delayed in an optical delay 126 and then sent to the beam projector 124. Because the laser beam 120 is split in beam splitter 122, it is still a coherent light source. Then, a receiver or detector 128 carried by the platform 12 is gated in time that only accepts light in a certain time band or time span. The receiver should be gated to accept the reflected laser beam or light 20B from when the first pulse (from the first portion 120-1) is returning back with information from below the surface 18 and when the second pulse (from the second portion 120-2) is returning back with information from the surface 18. Then, these two returning beams interfere with each other at least one pixel, some pixels, or every pixel on the focal array on the receiver 128 in the interferometer equipment. In another embodiment the range gated timeframe for the second portion 120-2 of the laser may straddle surface 18 such that the gate begins above the surface and terminates slightly below surface 18, as indicated by gate 130-2. Because the receiver has just one time gate, the first portion 120-1 of the laser beam 120 would thus be range gated to accept the return radiation 20B having a deeper start gate depth. In the preferred embodiment, the time separation between portions 120-1 and 120-2 is such that the in-gate return from 120-1 begins and ends below surface 18, as indicated by gate 130-1.

Referring back to the beam splitter 122, the beam splitter 122 may include or otherwise be in operational communication with optical delay 126. Optical delay 126 may be a delay line that delays the second portion 120-2 of the beam 120 (i.e., which results in the second beam) by a few nanoseconds. The amount that is delayed may vary depending on the application specific needs based on variables including, amongst other variables, scattering rate of the water. For example, since the first portion 120-1 or first beam needs to be stronger or brighter than the second beam, as discussed above, the delay line may delay 10% of the beam such that the first beam is nine times brighter or stronger than the second beam or second portion 120-2. Stated otherwise, when the overall laser beam pulse is generated and then split into two portions (i.e., the first beam and the second beam), the ratio of the amount of the overall beam pulse that is delayed via delay line to create the second beam relative to the portion of overall beam pulse that is not delayed to create the first beam may be 1:9 (10%:90%). In another embodiment, the ratio of the amount of the overall beam pulse that is delayed via delay line to create the second beam relative to the portion of overall beam pulse that is not delayed to create the first beam may be any ratio that adds up to 100% of the total projected energy. In another embodiment, the ratio of the amount of the overall beam pulse that is delayed via delay line to create the second beam relative to the portion of overall beam pulse that is not delayed to create the first beam may be 2:8 (20%:80%). In another embodiment, the ratio of the amount of the overall beam pulse that is delayed via delay line to create the second beam relative to the portion of overall beam pulse that is not delayed to create the first beam may be 2.5:7.5 (25%:75%). In another embodiment, the ratio of the amount of the overall beam pulse that is delayed via delay line to create the second beam relative to the portion of overall beam pulse that is not delayed to create the first beam may be 3:7 (30%:70%). In another embodiment, the ratio of the amount of the overall beam pulse that is delayed via delay line to create the second beam relative to the portion of overall beam pulse that is not delayed to create the first beam may be 4:6 (40%:60%). Because the surface reflectance is greater than the water volume reflectance, the intensity of the reflected light in slice of gates 130-1 and 130-2 may differ, unless the transmitted intensities or portions 120-1 and 120-2 are adjusted to compensate. Depending on applications specific needs, as well as the scattering rate of the water, these ratios may be critical to account for the intensity effect that occurs when the first beam is gated below surface 18 to ensure proper interference of the respective returning laser beams. Although delay lines have been contemplated herein to accomplish the delay, any other type of delay capable of delaying a portion of a split beam pulse is entirely possible. In one embodiment, the time delay for the second portion of the split laser beam is in a range from about 1 nanosecond to about 1000 nanoseconds (1 microsecond).

One exemplary advantage of straddling surface 18 with gate 130-2 is that gate 130-2 may observe the vibrations on surface 18. Typically, this is just a few microns of motion (i.e., 10 microns or less). However, this motion dissipates as the light moves deeper into the ocean from surface 18.

In one particular embodiment the deeper gate 130-1 that is entirely below surface 18 may be utilized as the reference phase for the shallower gate 130-2 that straddles surface 18. However, one consideration is that the gate 130-1 that is located entirely below surface 18 still requires laser beam 120 to progress through surface 18. This will cause a phase effect from the surface 18 even if the system is gating below the surface 18. The laser return from the gate 130-2 that straddles surface 18 will observe the entire height variance or deviation of the acoustically driven surface waves 24 and the laser that is gated below the water (i.e., gate 130-1) surface will observe the surface height variance or deviation but it will only be about ⅓ that of what the second portion 120-2 of laser beam 120 observed because of the index of refraction. This presents a surface motion at the portion 120-2 of laser beam 120 in the gate 130-2 that straddles the surface 18 and an attenuated surface motion at the portion 120-1 of beam 120 in the gate 130-1 below surface 18. By interfering range gate 130-1 with range gate 130-2 in, the speckle pattern senses about ⅔ of the surface-motion optical phase. Successive speckle patterns acquired as the surface moves will thus sense changes in phase corresponding to the amount in Eq. 51.

To account for the reflectance effect, the system may utilize an unequal beam splitter. Thus, in one embodiment, beam splitter 122 is an unequal beam splitter. More particularly, to account for the attenuation that is caused by the reflectance effect, the unequal beam splitter 122 may make the portion 120-1 of beam 120, which is sensing below surface 18 in gate 130-1, brighter or stronger than the portion 120-2 beam that is sensing and gated to straddle surface 18 at gate 130-2. This will allow the respective returning beams to have the same amplitudes to ensure that they interfere with each other properly for the interferometer equipment, acoustic wave detection logic, or a computer program product to perform the interferometric equations detailed herein. Essentially, the system may use an unequal beam splitter 122 to compensate for difference of reflectance of light at the surface and light below the surface. Then, the system exploits the properties of the phase change at the surface which is larger than the phase change from below the surface.

The gate timing is precise enough to gate the first portion 120-1 of beam 120 in gate 130-1 just below the surface 18. This may be important to this embodiment because the scattering of the water will de-cohere the first portion 120-1 of beam 120. If the portion 120-1 of beam 120 is gated too far below the surface 18 then there will not be a proper interference pattern. Thus, the portion 120-1 of beam 120 should be entirely below the surface but not too far below the surface.

Structurally, this embodiment utilizes narrow laser pulses (i.e., a few nanoseconds long) in a water-penetrating waveband (i.e., such as visible light waveband), a fast gating module, and an unequal beam splitter with the delay lines after the unequal beam splitter, a beam combiner, a beam projector, and a receiver having a focal plane, a gating module so that only the interfering during the correct time is what is observed that generates an interferogram. Then, the interferograms are sequentially put together to create an interferogram movie depicts the acoustically driven surface waves 24 moving through the scene. Thus, this embodiment is a type of interferometry but not necessarily shearography. One advantage of this embodiment is that it allows the system or an operator to exploit every pixel in the image as opposed to a few selected pixels when utilizing the shearographic techniques presented herein.

The first beam/first portion 120-1 and the delayed second beam/second portion 120-2 are transmitted to the beam projector 124. Then, the beam projector 124 projects the first beam and the second beam, wherein the second beam is delayed based on the time delay. The first and second beam are projected towards surface 18. The receiver is gated to have the first gate and the second gate. Recall, the first gate straddles surface 18 and second gate is entirely below surface 18.

The effects from the gravity-capillary waves are nullified by multi-shot processing of successive specklegrams acquired with a minimal time separation. The time separation is selected to be large enough for acoustic waves to evolve, yet short enough that the gravity-capillary waves are nearly stationary. Typically, successive specklegrams are collected milliseconds apart.

As described herein, aspects of the present disclosure may include one or more electrical or other similar secondary components and/or systems therein. The present disclosure is therefore contemplated and will be understood to include any necessary operational components thereof. For example, electrical components will be understood to include any suitable and necessary wiring, fuses, or the like for normal operation thereof. It will be further understood that any connections between various components not explicitly described herein may be made through any suitable means including mechanical fasteners, or more permanent attachment means, such as welding or the like. Alternatively, where feasible and/or desirable, various components of the present disclosure may be integrally formed as a single unit.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of technology disclosed herein may be implemented using hardware, software, or a combination thereof. When implemented in software, the software code or instructions can be executed on any suitable processor or collection of processors, whether provided in a single computer or distributed among multiple computers. Furthermore, the instructions or software code can be stored in at least one non-transitory computer readable storage medium.

Also, a computer or smartphone utilized to execute the software code or instructions via its processors may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers or smartphones may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software/instructions that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, USB flash drives, SD cards, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the disclosure discussed above. The computer readable medium or media can be transportable, such that the program or programs stored thereon can be loaded onto one or more different computers or other processors to implement various aspects of the present disclosure as discussed above.

The terms "program" or "software" or "instructions" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

All definitions, as defined and used herein, should be understood to control over dictionary definitions, definitions in documents incorporated by reference, and/or ordinary meanings of the defined terms.

"Logic", as used herein, includes but is not limited to hardware, firmware, software and/or combinations of each to perform a function(s) or an action(s), and/or to cause a function or action from another logic, method, and/or system. For example, based on a desired application or needs, logic may include a software controlled microprocessor, discrete logic like a processor (e.g., microprocessor), an application specific integrated circuit (ASIC), a programmed logic device, a memory device containing instructions, an electric device having a memory, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

Furthermore, the logic(s) presented herein for accomplishing various methods of this system may be directed towards improvements in existing computer-centric or internet-centric technology that may not have previous analog versions. The logic(s) may provide specific functionality directly related to structure that addresses and resolves some problems identified herein. The logic(s) may also provide significantly more advantages to solve these problems by providing an exemplary inventive concept as specific logic structure and concordant functionality of the method and system. Furthermore, the logic(s) may also provide specific computer implemented rules that improve on existing technological processes. The logic(s) provided herein extends beyond merely gathering data, analyzing the information, and displaying the results. Further, portions or all of the present disclosure may rely on underlying equations that are derived from the specific arrangement of the equipment or components as recited herein. Thus, portions of the present disclosure as it relates to the specific arrangement of the components are not directed to abstract ideas. Furthermore, the present disclosure and the appended claims present teachings that involve more than performance of well-understood, routine, and conventional activities previously known to the industry. In some of the method or process of the present disclosure, which may incorporate some aspects of natural phenomenon, the process or method steps are additional features that are new and useful.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

As used herein in the specification and in the claims, the term "effecting" or a phrase or claim element beginning with the term "effecting" should be understood to mean to cause something to happen or to bring something about. For example, effecting an event to occur may be caused by actions of a first party even though a second party actually performed the event or had the event occur to the second party. Stated otherwise, effecting refers to one party giving another party the tools, objects, or resources to cause an event to occur. Thus, in this example a claim element of "effecting an event to occur" would mean that a first party is giving a second party the tools or resources needed for the second party to perform the event, however the affirmative single action is the responsibility of the first party to provide the tools or resources to cause said event to occur.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

The invention claimed is:

1. A system comprising:

a laser beam generator, an unequal beam splitter, an optical delay, and a receiver, the receiver including a focal array;

a processor operatively connected to the receiver, the processor configured execute instructions on a non-transient computer readable storage medium to:

receive, at the receiver, a reflected first beam from a first portion of a laser beam interacting with an interface surface;

receive, at the receiver, a reflected second beam from a second portion of the laser beam interacting with the interface surface;

split, via the unequal beam splitter, the laser beam into the first portion and the second portion, wherein the first portion is allocated a larger fraction of the laser beam than the second portion;

delay, via the optical delay, the second portion from the first portion by a time delay;

range gate, for the reflected second beam, the receiver at a second gate that straddles the interface surface, beginning above the interface surface and terminating below the interface surface;

range gate, for the reflected first beam, the receiver at a first gate that is below the interface surface;

cause returns from the first portion and the second portion to arrive at the receiver and interfere on at least one pixel of the focal array to form speckle;

measure, via the processor, movement of acoustically driven surface waves at a reaction point on the interface surface in response to a subsurface acoustic wave interacting with the interface surface based on differenced images of the speckle; and disregard movement of gravity capillary waves.

2. The system of claim 1, wherein the processor executes instructions to:

range gate, for the reflected first beam, the receiver at the first gate such that the first gate is immediately and entirely below the interface surface.

3. The system of claim 1, wherein the processor executes instructions to:

range gate, for the reflected second beam, the receiver at the second gate such that the second gate begins above the interface surface and terminates below the interface surface.

4. The system of claim 1, wherein the time delay is in a range from about 1 nanosecond to about 1000 nanoseconds.

5. The system of claim 4, wherein the processor executes instructions to:

unequally split the laser beam into the first portion and the second portion with the first portion being about 90% of the laser beam and the second portion being about 10% of the laser beam.

6. The system of claim 4, wherein the processor executes instructions to:

unequally split the laser beam into the first portion and the second portion with the first portion being about 80% of the laser beam and the second portion being about 20% of the laser beam.

7. The system of claim 1, wherein the interface surface is defined between air and water.

8. The system of claim 1, wherein the interface surface is defined between air and a non-water fluid.

9. The system of claim 1, wherein the interface surface is defined between air and a translucent solid.

10. The system of claim 1, wherein the interface surface is defined between any translucent fluids or solids.

11. The system of claim 1, wherein the interface surface is a multiple-layer interface and acoustic or non-acoustic stresses perturb the multiple-layer interface.

12. The system of claim 1, wherein the acoustic wave detection logic executes instructions to:

vertically self-reference a pixel in the receiver with the reflected first beam and the reflected second beam by constructing a relative-phase reference for the laser beam based on the reflected first beam and the reflected second beam; and mix a laser-illuminated image with a horizontally-displaced image illuminated by the first portion and the second portion of the laser beam, respectively.

13. A system comprising:

a platform;

interferometer equipment carried by the platform, the interferometer equipment including a laser beam generator, an unequal beam splitter, an optical delay, and a receiver, the receiver including a focal array;

acoustic wave detection logic including a processor carried by the platform including a non-transient computer readable storage medium having instructions encoded thereon that, when executed by the processor, execute operations to:

transmit a first portion of a laser beam towards a surface of water;

transmit a second portion of the laser beam towards the surface of water;

receive, at the interferometer equipment, a reflected first beam from the first portion interacting with the surface of water;

receive, at the interferometer equipment, a reflected second beam from the second portion interacting with the surface of water;

split, via the unequal beam splitter, the laser beam into the first portion and the second portion, wherein the first portion is allocated a larger fraction of the laser beam than the second portion;

delay, via the optical delay, the second portion from the first portion by a time delay;

range gate, for the reflected second beam, the receiver at a second gate that straddles the surface of water, beginning above the surface of water and terminating below the surface of water;

range gate, for the reflected first beam, the receiver at a first gate that is below the surface of water; and cause returns from the first portion and the second portion to arrive at the receiver and interfere on at least one pixel of the focal array to form speckle;

measure, via the interferometer equipment, movement of acoustically driven surface waves at the surface of water at a reaction point in response to a subsurface acoustic wave interacting with the surface water based on differenced images of the speckle; and disregard movement of gravity capillary waves.

14. The system of claim 13, wherein the acoustic wave detection logic executes instructions to:

range gate, for the reflected first beam, the receiver at the first gate such that the first gate is immediately and entirely below the surface of water.

15. The system of claim 14, wherein the unequal split results in the first portion being about 80% of the laser beam and the second portion being about 20% of the laser beam.

16. The system of claim 13, wherein the acoustic wave detection logic executes instructions to:

range gate, for the reflected second beam, the receiver at the second gate such that the second gate begins above the surface of the water and terminates below the surface of water.

17. The system of claim 13, wherein the time delay is in a range from about 1 nanosecond to about 1000 nanoseconds.

18. The system of claim 17, wherein the acoustic wave detection logic executes instructions to:

unequally split the laser beam into the first portion and the second portion with the first portion being about 90% of the laser beam and the second portion being about 10% of the laser beam.

19. The system of claim 13, wherein the acoustic wave detection logic executes instructions to:

vertically self-reference a pixel in the receiver with the reflected first beam and the reflected second beam by constructing a relative-phase reference for the beam based on the reflected first beam and the reflected second beam; and mix a laser-illuminated image with a horizontally-displaced image illuminated by the first portion and the second portion of the laser beam, respectively.

20. A computer program product including least one non-transitory computer readable storage medium on a moving platform in operative communication with a computer processing unit (CPU) in interferometer equipment having a laser beam generator and a receiver, the storage medium having instructions stored thereon that, when executed by the CPU, implement a process to determine the presence of a acoustically driven surface waves at a surface of water generated from a subsurface acoustic source, the process comprising:

transmitting a first portion of a laser beam towards the surface of water, wherein the first portion is a larger fraction of the laser beam than the second portion;

transmitting a second portion of the laser beam towards the surface of water, wherein the second portion is delayed relative to the first portion by an optical delay by a time delay in a range from about 1 nanosecond to about 1000 nanoseconds;

receiving, at the interferometer equipment, a reflected first beam from the first portion interacting with the surface of water;

receiving, at the interferometer equipment, a reflected second beam from the second portion interacting with the surface of water;

range gating the receiver for the reflected second beam at a second gate that straddles the surface of water by beginning above the surface of water and terminating slightly below the surface of water;

range gating the receiver for the reflected first beam at a first gate that is entirely below and just below the surface of water; and measuring, via the interferometer equipment, movement of acoustically driven surface waves at the surface of water at a reaction point in response to a subsurface acoustic wave interacting with the surface water, wherein measuring movement is accomplished by causing returns form the first portion and the second portion to interfere on at least one pixel of the receiver focal array to form a speckle;

mixing a laser-illuminated image with a vertically-displaced image illuminated by the first portion and the second portion of the laser beam, respectively, and subtracting successive images of the surface acquired within milliseconds to eliminate an ordinary image of the surface and persistent random speckle and leave only the signal from the vibrating surface; and disregarding movement of gravity capillary waves.

* * * * *